United States Patent
Matsumoto

(10) Patent No.: US 8,559,028 B2
(45) Date of Patent: Oct. 15, 2013

(54) MULTIFUNCTION APPARATUS

(75) Inventor: Ritsuko Matsumoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 259 days.

(21) Appl. No.: 13/208,873

(22) Filed: Aug. 12, 2011

(65) Prior Publication Data

US 2012/0050777 A1     Mar. 1, 2012

(30) Foreign Application Priority Data

Aug. 25, 2010   (JP) ................. 2010/188165

(51) Int. Cl.
G06F 15/00   (2006.01)
G06F 3/12    (2006.01)
G06K 1/00    (2006.01)

(52) U.S. Cl.
USPC ......................................... 358/1.13; 358/1.15

(58) Field of Classification Search
None
See application file for complete search history.

(56) References Cited

U.S. PATENT DOCUMENTS

| | | | |
|---|---|---|---|
| 8,315,534 B2 * | 11/2012 | Yano et al. | 399/88 |
| 2003/0081261 A1 | 5/2003 | Tanimoto | |
| 2007/0159663 A1 | 7/2007 | Tsujimoto | |
| 2009/0010662 A1 * | 1/2009 | Naoi et al. | 399/44 |

FOREIGN PATENT DOCUMENTS

| | | |
|---|---|---|
| JP | 2000-218894 A | 8/2000 |
| JP | 2002-178604 A | 6/2002 |
| JP | 2003134281 A | 5/2003 |
| JP | 2004142186 A | 5/2004 |
| JP | 2007-174400 A | 7/2007 |

* cited by examiner

*Primary Examiner* — Douglas Tran
(74) *Attorney, Agent, or Firm* — Edwards Wildman Palmer LLP; David G. Conlin; Edmund J. Koundakjian

(57) ABSTRACT

A multifunction apparatus includes: an image forming section having (i) a normal operation mode and (ii) a waiting mode which is lower in power consumption than the normal operation mode, between which a mode of the mode switching target member is switchable; a second web server section for acquiring a command generated based on an external application; and a control application section for determining whether or not the command thus acquired is a specific command to execute a preprocess which is a process related to a specific function that causes the image forming section to operate and which is carried out before the specific function is executed, and for, if the control application section determines that the command thus acquired is a specific command, starting a warm-up for switching the image forming section from the waiting mode to the normal operation mode.

6 Claims, 12 Drawing Sheets

MULTIFUNCTION APPARATUS

This Nonprovisional application claims priority under 35 U.S.C. §119(a) on Patent Application No 2010-188165 filed in Japan on Aug. 25, 2010, the entire contents of which are hereby incorporated by reference.

TECHNICAL FIELD

The present invention relates to a multifunction apparatus which operates in cooperation with an application of an information processing apparatus.

BACKGROUND ART

It is necessary for a printer employing an electrophotographic technology or a multifunction apparatus employing the electrophotographic technology to (i) stably drive a scanner motor and (ii) set a temperature of a fixing device to be within a predetermined range, so as to appropriately carry out a scanning process or a printing process. For this reason, a warm-up is carried out before, for example, the printing process is carried out, so that the fixing device has a temperature in the predetermined range when the printing process is started.

However, such a warm-up causes a user to wait until the warm-up is completed. In view of this, there has been known a technique for reducing a waiting time period of a user. For example, Patent Literature 1 discloses a technique by which in a system that transmits print data from a computer to a printing apparatus and causes the printing apparatus to carry out printing, a power-saving function control command to start a warm-up is sent from the computer to the printing apparatus when a user carries out an input operation on the computer.

Furthermore, in recent years, a multifunction apparatus has been connected to a PC (personal computer) or the like via a communication network so as to carry out various processes. Specifically, the following technique has been developed. That is, a multifunction apparatus serves as a part of a total application system in such a manner that an application that is executable on an external information processing apparatus and a function of the multifunction apparatus operate in cooperation with each other (see Patent Literature 2).

Citation List

Patent Literature 1

Japanese Patent Application Publication, Tokukai, No. 2000-218894 A (Publication Date: Aug. 8, 2000)

Patent Literature 2

Japanese Patent Application Publication, Tokukai, No. 2007-174400 A (Publication Date: Jul. 5, 2007)

SUMMARY OF INVENTION

Technical Problem

According to the technique disclosed in Patent Literature 2, the multifunction apparatus carries out a process, such as a copying process or a printing process, on receipt of an instruction from an application that operates on the information processing apparatus. With the arrangement, however, the multifunction apparatus cannot recognize which process is to be carried out, until it receives the instruction from the application. Accordingly, the multifunction apparatus starts the warm-up after it receives the instruction to execute the printing function from the application.

FIG. 13 is a view showing an example of the flow of a process in a conventional system in which a multifunction apparatus and an information processing apparatus cooperate with each other. As shown in FIG. 13, the information processing apparatus first sends the multifunction apparatus a copy parameter acquisition request for parameters relevant to a copying function and unique to the multifunction apparatus (e.g., information indicative of the presence or absence of a two-sided copying function) (first stage). Upon receiving the request, the multifunction apparatus sends, in return, copy parameter information indicative of the copy parameters to the information processing apparatus (second stage). Next, in accordance with the copy parameter information, the information processing apparatus sends a copy execution command to the multifunction apparatus (third stage). Upon receiving the copy execution command, the multifunction apparatus determines that it needs to execute copying, and therefore starts a warm-up (fourth stage). Then, after completion of the warm-up, the multifunction apparatus starts copying (fifth stage).

In such a conventional system in which a multifunction apparatus and an information processing apparatus cooperate with each other, the multifunction apparatus starts a warm-up after it receives a copy execution command. This causes a user to wait for a long time until the warm-up is completed.

Such a problem may be solved by applying the technique disclosed in Patent Literature 1 to the technique disclosed in Patent Literature 2. That is, it is possible to cause the application to transmit, in advance, to the multifunction apparatus, a specific command for causing the multifunction apparatus to start carrying out the warm-up. According to such a technique, however, it is necessary for the application to transmit a specific command, such as the power-saving function control command described in Patent Literature 1, to the multifunction apparatus. This causes an increase in cost for development of the application. Further, according to the technique of Patent Literature 1, a command is sent at the timing when the user carries out an input operation on the computer, but in a system in which a multifunction apparatus and an information processing apparatus cooperate with each other, the user carries out an input operation on the multifunction apparatus. This makes it impossible to simply apply the technique of Patent Literature 1 to the technique of Patent Literature 2.

The present invention is made in view of the problems. An object of the present invention is to provide a multifunction apparatus which can reduce a user's waiting time period in a system in which an application that is executable on an external information processing apparatus and a function of the multifunction apparatus operate in cooperation with each other.

Solution to Problem

In order to attain the object, a multifunction apparatus of the present invention is a multifunction apparatus which carries out a cooperation process in cooperation with an application executed on an external information processing apparatus, including: a mode switching target member having (i) a normal operation mode and (ii) a waiting mode which is lower in power consumption than the normal operation mode, the mode switching target member being switchable between the normal operation mode and the waiting mode; a command acquisition section for acquiring a command generated based on the application; and a command analysis section for determining whether or not the command acquired by the command acquisition section is a specific command to execute a preprocess which is a process related to a specific function that causes the mode switching target member to operate and which is carried out before the specific function is executed, and for, if the command analysis section determines that the command acquired by the command acquisition section is the specific command, starting a switching operation for switching the mode switching target member from the waiting mode to the normal operation mode or starting a part of the switching operation.

Advantageous Effects of Invention

According to the present invention, it is possible to reduce a user's waiting time period in a system in which an application that is executable on an external information processing apparatus and a function of a multifunction apparatus operate in cooperation with each other.

BRIEF DESCRIPTION OF DRAWINGS

FIG. 1 is a view illustrating an arrangement of a multifunction apparatus control system in accordance with Embodiment 1.

FIG. 2 is a block diagram illustrating an internal structure of a control application section provided in a multifunctional apparatus.

FIG. 3 is a flow chart showing the flow of a cooperative operation mode in which a multifunction apparatus and an information processing apparatus execute a process in cooperation with each other.

FIG. 4 is a view illustrating an example of an initial operation screen.

FIG. 5 is a flow chart showing the flow of a warm-up start process.

FIG. 6 is a view explaining the timing of start of a warm-up in Embodiment 1.

FIG. 7 is a view showing the sequence of a specific example process of a cooperative operation mode in Embodiment 1.

FIG. 8 is a view illustrating an example of a copy operation screen created in accordance with parameters.

FIG. 9 is a view illustrating an arrangement of a multifunction apparatus control system in accordance with Embodiment 2.

FIG. 10 is a view showing the sequence of a specific example process of a cooperative operation mode in Embodiment 2.

FIG. 11 is a view showing the sequence of a specific example process of a cooperative operation mode in a modified example.

FIG. 12 is a view showing the sequence of a specific example process of a cooperative operation mode in another modified example.

FIG. 13 is a view explaining the timing of start of a conventional warm-up.

DESCRIPTION OF EMBODIMENTS

[Embodiment 1]

One embodiment of the present invention is described below with reference to FIGS. 1 through 8. The following description deals with one embodiment of a multifunction apparatus control system of the present invention.

<Arrangement of a Multifunction Apparatus Control System>

Figure 1:
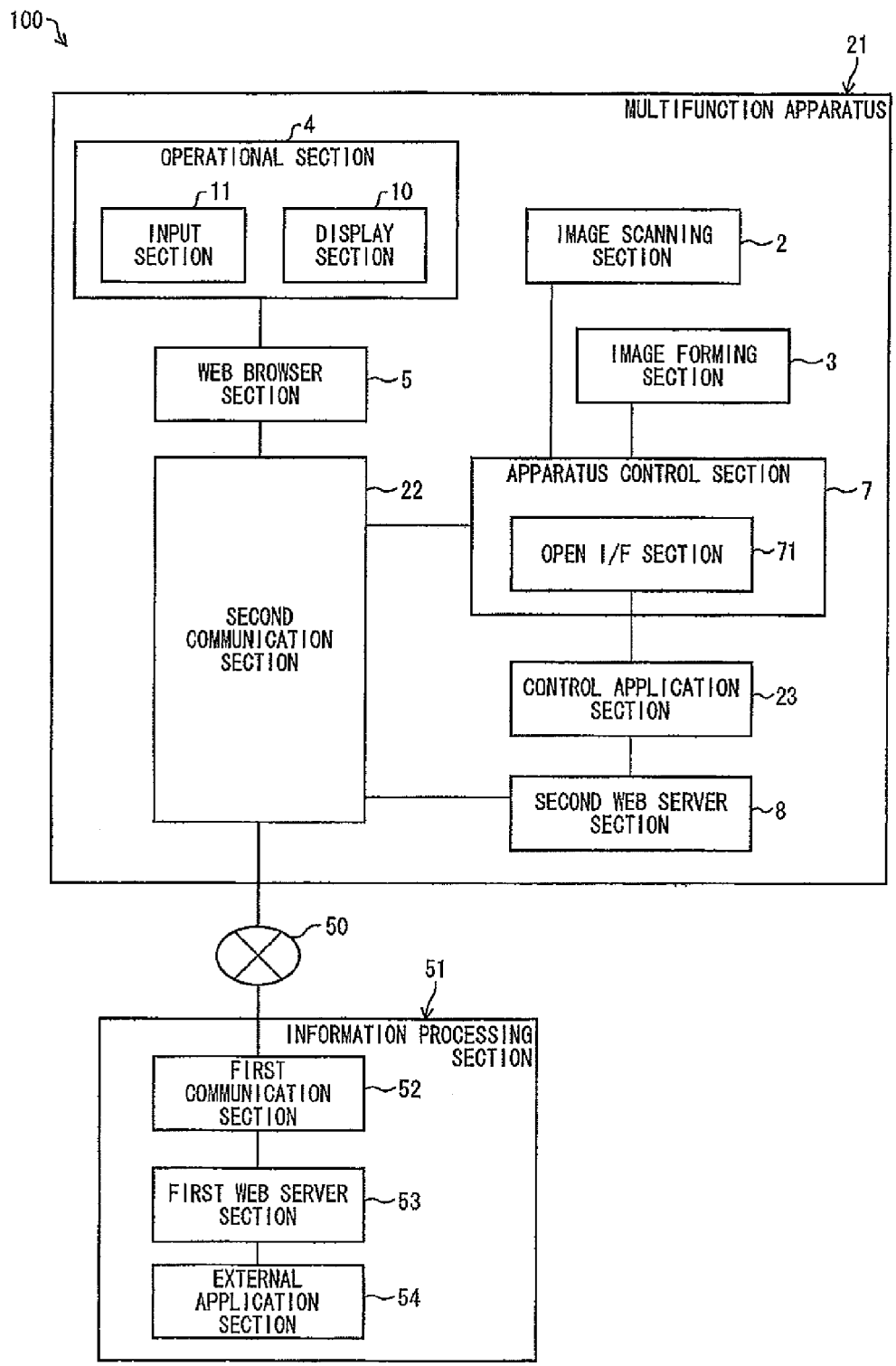
FIG. 1

FIG. 1 is a view illustrating an arrangement of a multifunction apparatus and an information processing apparatus in a multifunction apparatus control system in accordance with one embodiment of the present invention. As illustrated in FIG. 1, the multifunction apparatus control system includes a multifunction apparatus 21 and an information processing apparatus 51, which communicate with each other via a communication network 50. As a matter of course, in the multifunction apparatus control system, (i) a plurality of multifunction apparatuses 21 can be provided instead of a single multifunction apparatus 21, and (ii) a plurality of information processing apparatuses 51 can be provided instead of a single information processing apparatus 51.

Examples of the communication network 50, via which the multifunction apparatus 21 and the information processing apparatus 51 communicate with each other, encompass the Internet, a telephone line, a serial cable, and other wired or wireless communication lines. The multifunction apparatus 21 and the information processing apparatus 51 communicate with each other by use of an HTTP (Hyper Text Transfer Protocol), which is a protocol for use in communication between a web server and a web browser (e.g., a request for and transmission of a web page).

The multifunction apparatus 21 receives HTML (Hypertext Markup Language) formatted data from the information processing apparatus 51 by use of the HTTP. Then, in accordance with the data thus received, the multifunction apparatus 21 carries out processes related to various functions (such as a scanning function, a printing function, a copying function, and a communicating function).

Examples of data that the multifunction apparatus 21 receives from the information processing apparatus 51 encompass a command to execute any of the various functions, such the scanning function, the printing function, and the copying function, of the multifunction apparatus 21 and a command to start a preprocess (e.g., a process for transmitting parameters for the copying function, the printing function, or the like) that is carried out before the function is executed.

In executing any of the various functions, such as the scanning function, the printing function, and the copying function, of the multifunction apparatus 21, the multifunction apparatus 21 for example receives, from the information processing apparatus 51, HTML data indicative of an operation screen and displays the operation screen indicated by the HTML data. Then, in accordance with an instruction entered via the operation screen, the multifunction apparatus 21 executes one of the various functions which corresponds to the instruction.

Alternatively, the multifunction apparatus 21 may execute any of its various functions by executing a command described in Java (registered trademark) script in control information received from the information processing apparatus 51. In this way, the multifunction apparatus 21 carries out a cooperative process in cooperation with an application executed on the information processing apparatus 51.

<Configuration of the Information Processing Apparatus>

The information processing apparatus 51 is a computer device constituted by an arithmetic processing section such as a CPU or a special purpose processor, and a storage section such as an RAM, a ROM, or an HDD, and serves as a web server device that is shared by a plurality of multifunction apparatuses 21. As illustrated in FIG. 1, the information processing apparatus 51 includes a first communication section 52, a first web server section 53, and an external application section 54.

The first communication section 52 communicates with the multifunction apparatus 21 via a LAN, an Internet line, etc. Further, the first communication section 52 communicates with the multifunction apparatus 21 by use of a communication protocol such as the HTTP.

The first web server section 53 operates in accordance with software of a web server. The term "web server" here means software that provides the functions of a server device constituting the WWW (World Wide Web), which is an information system on the Internet. The first web server section 53 functions to receive a request (which is an HTTP request here) from the multifunction apparatus 21 via the first communication section 52 and respond to the multifunction apparatus 21 via the first communication section 52 with a file, image data, print data, control information, etc. corresponding to the HTTP request.

The external application section 54 carries out an operation in accordance with a predetermined web application in response to an instruction from the first web server section 53. That is, the external application section 54 carries out an operation in accordance with a corresponding one of various web applications which operate on a web server. Such web applications are custom applications described in, for example, Java (registered trademark) script, and operate in a Java (registered trademark) script execution environment provided on the web server.

For example, in a case where the request (HTTP request) from the multifunction apparatus 21 is a request for transmission of an operation screen via which any of the functions of the multifunction apparatus 21 is executed, the external application section 54 carries out an operation in accordance with an application on which the function operates. Specifically, in order to generate an operation screen for the function requested, the external application section 54 sends the multifunction apparatus 21 a parameter request command to request parameters relevant to the function and unique to the multifunction apparatus 21. Then, the external application section 54 generates, in accordance with the parameters transmitted from the multifunction apparatus 21, HTML data of an operation screen corresponding to the multifunction apparatus 21, and sends the HTML data to the multifunction apparatus 21 via the first web server section 53 and the first communication section 52.

According to the present embodiment, in transmitting a command to carry out a process related to any of the functions (such as the scanning function, the printing function, and the copying function) of the multifunction apparatus 21, the external application section 54 sends the web browser section 5 of the multifunction apparatus 21 an HTTP response that causes the web browser section 5 to change to accessing the second web server section 8 provided inside of the multifunction apparatus 21. This allows the multifunction apparatus 21 to carry out a process related to any of its various functions in accordance with a command from the control application section 23 provided inside of the multifunction apparatus 20, not a command from the information processing apparatus 51 having the external application section 54. As a result, even if there exists a firewall that blocks communication of a control command between the multifunction apparatus 21 and the information processing apparatus 51, the multifunction apparatus 21 can normally control any of its various functions in accordance with an entry from the user via the operation screen as received from the information processing apparatus 51.

Note that examples of commands to carry out processes related to the functions (such as the scanning function, the printing function, and the copying function) of the multifunction apparatus 21 encompass commands to execute the functions and commands to start preprocesses (e.g., processes for transmitting parameters for the functions) that are carried out before the functions are executed.

For example, the external application section 54 puts a loopback address in HTML data to be transmitted to the multifunction apparatus 21, and the loopback address allows the web browser section 5 to access the second web server section 8 inside of the multifunction apparatus 21 when a button for executing a process related to any of the functions (such as the scanning function, the printing function, and the communicating function) of the multifunction apparatus 21 has been pressed on an operation screen indicated by HTML data transmitted to the multifunction apparatus 21. The term "loopback address" means a virtual IP address, assigned to the loopback interface of a network card (e.g., hardware that is responsible for the functions of a communication section), which indicates the apparatus to which it has been assigned. Such a loopback address is a publicly-known address that is used in a general-purpose web browser.

Alternatively, the external application section 54 may use HTTP redirection to transmit, to the multifunction apparatus 21, a response (HTTP response) containing an instruction to change URLs, in order that the web browser section 5 accesses the second web server section 8 provided inside of the multifunction apparatus 21. The term "HTTP redirection" means a type of response from a web server according to the HTTP, for use in data transmission and reception, which indicates a change of URL. The HTTP redirection is a publicly-known function that is used in a general-purpose web browser.

Alternatively, the external application section 54 may transmit, to the multifunction apparatus 21, an HTTP response whose instruction to access the second web server section 8 provided inside of the multifunction apparatus 21 and notify the second web server section 8 of a command to carry out the process is described in Java (registered trademark) script. The Java (registered trademark) script is executable on a general-purpose web browser, and according to the Java (registered trademark) script, the web browser section 5 can notify the second web browser section 8 of the command to carry out the process, <Configuration of the Multifunction Apparatus>

Next, the following description deals with a configuration of the multifunction apparatus 21. The multifunction apparatus 21 is an apparatus capable of carrying out a plurality of functions such as a scanning function, a printing function, a copying function, a facsimile sending/receiving function, an image data sending function.

As illustrated in FIG. 1, the multifunction apparatus 21 includes an operational section 4, an image scanning section 2, an image forming section 3, a web browser section 5, a second communication section 22, an apparatus control section 7, a second web server section 8, and an control application section (control section) 23.

The operational section 4 is a user interface via which (i) a user is notified of various information and (ii) the multifunction printer 21 receives an input from the user. The operational section 4 includes a display section 10 such as an LCD (Liquid Crystal Display), and an input section 11 having various input keys. Note that the operational section 4 can be a touch panel in which the display section 10 and the input section 11 are integrally provided.

The image scanning section 2 includes a scanner and a document carrying section which carries a document to the scanner. The image scanning section 2 scans, as image data, objects (such as characters and images) which are printed on a document. Note that the image scanning section 2 scans an image so that a scanned image has a predetermined resolution.

The image forming section 3 is provided for printing an image (character/photograph/graphic) on a recording sheet such as paper in accordance with inputted image data. The image forming section 3 includes a photoreceptor drum, a charging device, an exposure device, a developing device, a transfer device, a fixing device, and a sheet tray. Specifically, the image forming section 3 carries out the printing in the following manner. First, a surface of the photoreceptor drum is electrostatically charged by the charging device. Then, the photoreceptor drum is irradiated with light by the exposure device in accordance with image data, so that a pattern identical with an image indicated by the image data is charged on the photoreceptor drum. After that, a toner is supplied to the surface of the photoreceptor drum by the developing device. Then, the transfer device transfers a toner image to a recording sheet. Ultimately, the fixing device applies heat to the toner so that the toner is melt and fixed to the recording sheet. An image is formed on a recording sheet in this manner. Such a printing process is carried out on the basis of image data received from the image scanning section 2 or image data received from an external device.

Here, application of sufficient heat to the toner is necessary to appropriately carry out the fixing of the toner. Therefore, it is necessary to sufficiently supply electricity to a heater of the fixing device so as to cause a part of the fixing device to have a temperature in a predetermined range (e.g., in a range of 160° C. to 180° C.), which part is to be in contact with the toner. In terms of energy conservation, however, it is preferable to suppress power consumption of the heater of the fixing device as much as possible.

For this reason, the image forming section 3 has a normal operation mode and a waiting mode. According to the normal operation mode, the contact area of the surface of the fixing device, which contact area is to be in contact with the toner, is set to have an appropriate temperature to fix the toner on the recording sheet. On the other hand, according to the waiting mode, the power consumption is suppressed to be lower than that of the normal operation mode. In other words, the fixing device is set so that the heater of the fixing device receives less electric power in the waiting mode than in the normal operation mode. A warm-up is a process for switching the image forming section 3 from the waiting mode to the normal operation mode. The image forming section 3 carries out the warm-up before carrying out the printing or copying process. Further, the image forming section 3 switches from the normal operation mode to the waiting mode in a case where no instruction to carry out another printing or copying process is made within a predetermined time period since the printing or copying process was completed.

Note that the image forming section 3 starts the warm-up of the fixing device in accordance with an instruction received from the apparatus control section 7. In this manner, the image forming section 3 serves as a mode switching target member that has the normal operation mode and the waiting mode. According to the present embodiment, a function for which the warm-up is necessary is a function which causes the image forming section 3 to operate, which warm-up is the process for switching the image forming section 3 from the waiting mode to the normal operation mode.

The second communication section 22 is an interface via which the multifunction apparatus 21 communicates with an external device such as the information processing apparatus 51. In the present embodiment, as mentioned above, the second communication section 22 communicates with the information processing apparatus 51 by use of the HTTP. Further, in a case where the IP address of the multifunction apparatus 21 is indicated as a destination of access, the second communication section 22 can access the second web server section 8 provided inside of the multifunction apparatus 21.

The web browser section 5 operates in accordance with software of a general-purpose web browser. The web browser section 5 can communicate not only with the first web server section 53 of the information processing apparatus 51, but also with the second web server section 8 provided inside of the multifunction apparatus 21.

In the present embodiment, the web browser section 5 communicates with the first web server section 53 of the information processing apparatus 51 in a case where operation screen data or print data is requested and in a case where a process related to any of the various functions (such as the scanning function, the printing function, and the copying function) of the multifunction apparatus 21 is not carried out. Meanwhile, the web browser section 5 is set to communicate with the second web server section 8 inside of the multifunction apparatus 21 in a case where a process related to any of the various functions of the multifunction apparatus 21 is carried out. A specific example of this setting will be described later.

The second web server section 8 operates in accordance with software of a general-purpose web server. The second web server section 8 receives a request (HTTP request) from the web browser section 5, causes the multifunction apparatus 21 to execute an application corresponding to the request, and sends a response (HTTP response) to the web browser section 5.

The second web server section 8 is notified by the web browser section 5 of a command transmitted from the first web server section 53. It should be noted here that a command that is transmitted from the first web server section 53 is one that is generated by the external application section 54. Therefore, by being notified by the web browser section 5 of a command that is transmitted from the first web server section 53, the second web server section 8 functions as a command acquisition section that acquires the command as a command generated by the external application section 54.

The control application section 23 carries out a process in accordance with a web application that operates on a web server. Such web applications are custom applications described in, for example, Java (registered trademark) script, and operate in a Java (registered trademark) script execution environment provided on the web server.

The control application section 23 operates in accordance with an instruction from the second web server section 8. For example, in a case where it is necessary to carry out a process related to any of the various functions (such as the scanning function, the printing function, and the copying function) of the multifunction apparatus 21, the control application section 23 sends the apparatus control section 7 a command to carry out the process. Further, the control application section 23 may control the web browser section 5 in accordance with an instruction from the second web server section 8 to control communication so that parameters unique to the multifunction apparatus 21 are transmitted to the first web server section 53.

Figure 2:
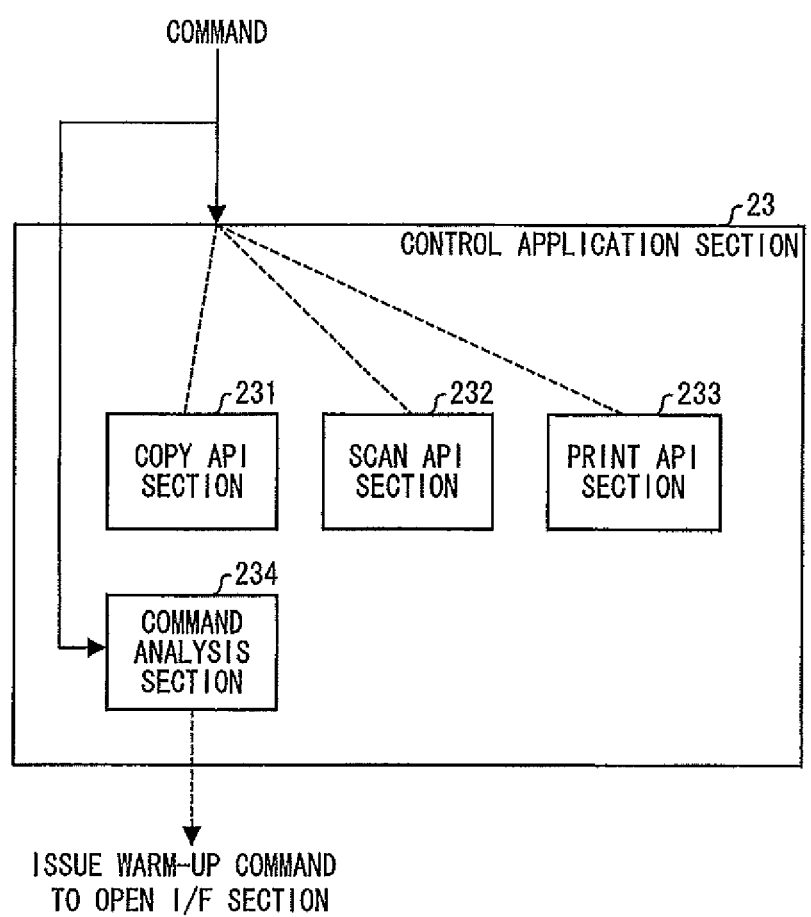
FIG. 2

FIG. 2 is a block diagram illustrating an internal structure of the control application section 23. As illustrated in FIG. 2, the control application section 23 includes a COPY API section 231, a SCAN API section 232, a PRINT API section 233, and a command analysis section 234.

The COPY API section 231 receives an instruction of API disclosed by an application for carrying out a process related to the copying function of the multifunction apparatus 21 and carries out a process in accordance with the instruction thus received.

The SCAN API section 232 receives an instruction of API disclosed by an application for carrying out a process related to the scanning function of the multifunction apparatus 21 and carries out a process in accordance with the instruction thus received.

The PRINT API section 233 receives an instruction of API disclosed by an application carrying out a process related to the printing function of the multifunction apparatus 21 and carries out a process in accordance with the instruction thus received.

A command that is received by the COPY API section 231, the SCAN API section 232, or the PRINT API section 233 contains type information indicative of the type of API section by which the command is to be received (i.e., information indicative of COPY, SCAN, or PRINT) and process content information indicative of the content of a process to be carried out. The COPY API section 231, the SCAN API section 232, and the PRINT API section 233 each receive a command whose type information indicates the corresponding API and carry out a process in accordance with the process content information.

The command analysis section 234 analyzes a command received by the control application section 23 and determines, in accordance with a result of the analysis, whether or not to start a warm-up of a mode switching target member (which is the information forming section 3 in the present embodiment) of the multifunction apparatus 21. It should be noted here that the command received by the control application section 23 is a command, transmitted from the first web server section 53, of which the second web server section 8 has been notified by the web browser section 5. Therefore, a command that is analyzed by the command analysis section 234 is one generated by the external application section 54.

Specifically, the command analysis section 234 determines whether or not the command is a command (specific command) to execute a preprocess, related to a function (specific function) for which a warm-up in necessary, which is carried out before the function is executed and, if the command is a command to execute a preprocess, determines that the warm-up of the image forming section 3 should be started.

As mentioned above, the command contains type information and process content information. By confirming the type information contained in the command, the command analysis section 234 can determine whether or not the command is a command related to a function for which a warm-up is necessary. In the present embodiment, in a case where the type information indicates "COPY" or "PRINT", the command analysis section 234 needs only determine that the command is a command related to a function a function for which a warm-up is necessary.

Further, by confirming the process content information contained in a command, the command analysis section 234 can determine whether or not the command is a command to execute a preprocess. That is, the command analysis section 234 has the process content information, contained in a command to execute a preprocess, stored in advance therein as registered information. Moreover, the command analysis section 234 needs only determine whether or not the process content information contained in a command received by the control application section 23 matches the registered information and, if the process content information matches the registered information, determine that the command is a command to execute a preprocess. For example, in a case of process content information indicative of a request for transmission of parameters for a specific function (copying function or printing function) for which a warm-up is necessary and parameters unique to the multifunction apparatus 21, the command analysis section 234 determines that the command is a command to execute a preprocess.

In a case where it has been decided that the warm-up of the image forming section 3 is started, the command analysis section 234 generates a command to start a warm-up and sends the command to the apparatus control section 7.

The apparatus control section 7 controls processes related to the various functions of the multifunction apparatus 21. Specifically, the apparatus control section 7 controls operation each of the sections such as the image scanning section 2, the image forming section 3, the second communication section 22, and the operational section 4.

For example, the apparatus control section 7 controls the operation of the image scanning section 2 to obtain data of a scanned image. Further, the apparatus control section 7 controls the operation of the image forming section 3 to (i) form an image indicated by inputted image data on a sheet and (ii) eject the sheet. Furthermore, the apparatus control section 7 uses the second communication section 22 to store inputted image data in a designated external resource or to attach inputted image data to an e-mail and send the e-mail to a designated address.

Further, upon receiving a command to start a warm-up, the apparatus control section 7 switches the image forming section 3 from the waiting mode to the normal operation mode.

The apparatus control section 7 has a unique operation mode and a cooperative operation mode. The unique operation mode is a mode in which to cause the display section 10 to display an operation screen unique to the multifunction apparatus 21 and stored in advance in the multifunction apparatus 21, to receive, from the input section 11, an instruction entered via the operation screen, and to carry out such control as described above in accordance with the instruction. The cooperative operation mode is a mode in which to cause the display section 10 to display an operation screen received from the information processing apparatus 51 and to carry out such control as described above in accordance with a control instruction received from a control application on the basis of an instruction entered via the operation screen (i.e., a mode in which to carry out a process of cooperation with the information processing apparatus 51. It should be noted that the unique operation mode is a general mode that is carried out in a conventional multifunction apparatus, and as such, is not described here in detail.

It should be noted that in a case where an instruction to carry out the cooperative operation mode has been entered, the apparatus control section 7 starts up the web browser section 5 and causes the web browser section 5 to carry out a process in accordance with a preset URL (which in the present embodiment is an URL that requests the first web server section 53 of the information processing apparatus 51 to transmit an initial operation screen). Moreover, in the cooperative operation mode, the apparatus control section 7 receives a command from the control application section 23 and carries out control in accordance with the command.

The apparatus control section 7 includes an Open I/F section 71 capable of receiving a command regardless of the model of multifunction apparatus 21. The Open I/F section 71, which discloses to the control application section 23 commands to control the various functions of the multifunction apparatus 21, receives a command from the control application section 23 and converts the command thus received into a command that can be recognized by the apparatus control section 7.

The Open I/F section 71 includes a conversion table storage section (not illustrated) having stored therein a conversion table in which a disclosed command and a command that can be recognized by the apparatus control section 7 are associated with each other, and carries out a command conversion process in accordance with the conversion table.

In this way, the Open I/F section 71 is capable of receiving a common command regardless of the model of multifunction apparatus 21. This makes it possible to use a common web application for operating the control application section 23, regardless of the multifunction apparatus 21. Therefore, in a case of operating the control application section 23 in accordance with a new web application, it is only necessary to install the same web application in each multifunction apparatus 21, and it is no longer necessary to vary web applications from multifunction apparatus 21 to multifunction apparatus 21. This makes it possible to easily develop a web application for operating the control application section 23.

<Process Flow of the Cooperative Operation Mode>

Figure 3:
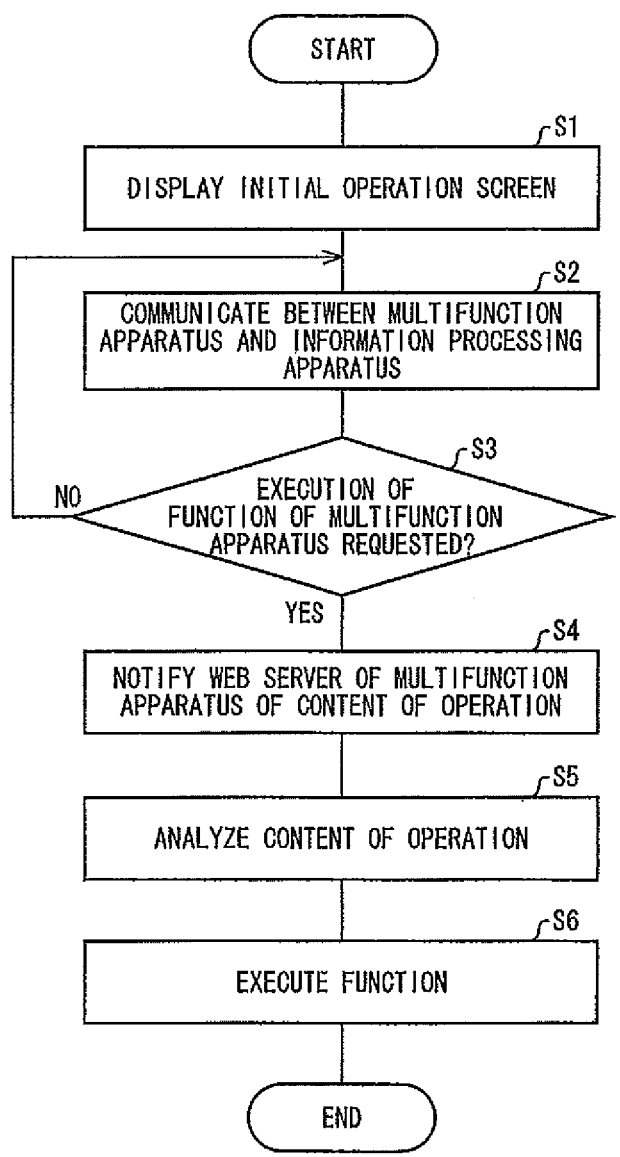
FIG. 3

Next, the flow of a process in the cooperative operation mode by which the multifunction apparatus 21 and the information processing apparatus 51 carry out a process in cooperation with each other is described with reference to FIG. 3. FIG. 3 is a flow chart showing the flow of a process in the cooperative operation mode.

Figure 4:
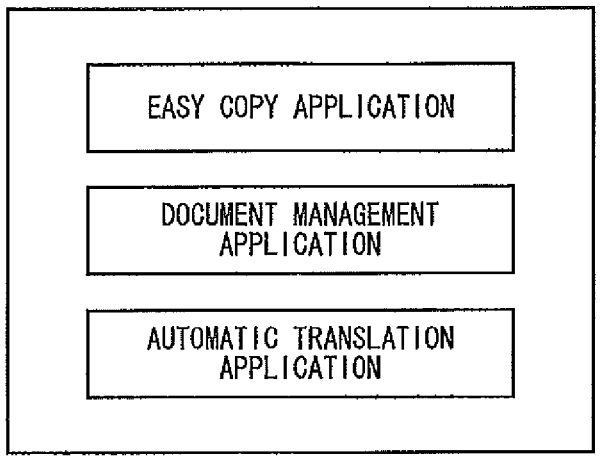
FIG. 4

First, when an instruction to start up the cooperative operation mode has been entered via the input section 11, the apparatus control section 7 starts up the web browser section 5 and causes the web browser section 5 to access a preset URL. The preset URL here is a URL that requests the first web server section 53 of the information processing apparatus 51 to transmit an initial operation screen. Therefore, the web browser section 5 sends through the second communication section 22 an HTTP Get command that requests the information processing apparatus 51 to transmit an initial operation screen. The first web server section 53 of the information processing apparatus 51, in return, sends the multifunction apparatus 21 HTML data corresponding to an initial operation screen corresponding to the Get command. Moreover, the web browser section 5 of the multifunction apparatus 21 causes the display section 10 to display the screen indicated by the HTML data thus received (S1). The initial operation screen displayed here is a selection screen via which an application is selected. FIG. 4 is a view illustrating an example of the initial operation screen. As illustrated in FIG. 4, the initial operation screen displayed contains a list of applications operable on the external application section 54 and prompts the user to select any one of the applications.

Next, once the application to be executed has been selected, the external application section 54 operates in accordance with the application thus selected. Then, the web browser section 5 of the multifunction apparatus 21 and the first web server section 53 of the information processing apparatus 51 communicate with each other in accordance with the operation of the external application section 54 (S2).

During the communication in S2, for example, the first web server section 53 transmits, to the web browser section 5, HTML data of an entry screen that prompts the user to enter processing conditions for executing any of the functions of the multifunction apparatus 21, and the web browser section 5 transmits, to the first web server section 53, information indicative of the processing conditions thus entered.

Further, during the step of S2, the web browser section can also access the second web server section 8 in accordance with an instruction received from the first web server section 53 and notify the second web server section 8 of a command received from the first web server section 53. Moreover, upon receiving the command, the second web server section 8 sends the command to the control application section 23 and operates one of the API sections which corresponds to the command. In the present embodiment, the control application section 23, upon receiving a specific command, generates a command to start a warm-up of the image forming section 3, which is a mode switching target member, and outputs the command to the apparatus control section 7, whereby the warm-up is started. This process for starting a warm-up will be described later.

After that, the step of S2 is repeated until the first web server section 53 sends the web browser section 5 an instruction to start execution of any of the various functions of the multifunction apparatus 21.

In a case of an instruction that requests the start of execution of any of the various functions of the multifunction apparatus 21 (Yes in S3), the web browser section 5 notify the second web browser 8 of the multifunction apparatus 21 accordingly (S4). In the present embodiment, an HTTP response from the information processing apparatus 51 to the multifunction apparatus 21 is devised so that in a case where any of the various functions of the multifunction apparatus 21 is executed, the second web browser 8 of the multifunction apparatus 21 is notified accordingly.

Specifically, the external application section 54 of the information processing apparatus 51 sets, in advance in operation screen HTML data to be transmitted to the multifunction apparatus 21, a loopback address as the address of a destination to be accessed when a button for executing any of the various functions of the multifunction apparatus 21 has been pressed. This allows the web browser section 5 to, when a button for executing any of the various functions of the multifunction apparatus 21 has been pressed on the operation screen, access the second web server section 8 inside of the multifunction apparatus 21 in accordance with the loopback address and notify the second web server section 8 of the instruction to execute the function.

Alternatively, the external application section 54 of the information processing apparatus 51 may set the first web server section 53 of the information processing apparatus 51 in advance as a destination to be accessed when a button for executing any of the various functions of the multifunction apparatus 21 has been pressed on an operation screen transmitted to the multifunction apparatus 21. In this case, upon receiving an HTTP request indicating that a button for executing any of the various functions of the multifunction apparatus 21 has been pressed on the operation screen, the external application section 54 uses HTTP redirection to transmit, to the multifunction apparatus 21, an HTTP response that changes the destination of access to the second web server section 8 of the multifunction apparatus 21. This allows the web browser section 5 of the multifunction apparatus 21 to access the second web server section 8 of the multifunction apparatus 21 in accordance with the HTTP response and notify the second web server section 8 of the instruction to start execution of the function.

After that, the control application section 23, which has been started up by the second web server section 8, analyzes the content of the instruction to start the execution of the function as received from the web browser section 5 (S5).

Then, the control application section 23 generates a command to start the execution of the function of the multifunction apparatus 21, based on a result of the analysis, and sends the command to the Open I/F section 71. Upon receiving the command, the Open I/F section 71 converts the command into a command that can be recognized by the apparatus control section 7. After that, the apparatus control section 7 executes the function in accordance with the command thus converted (S6).

<Warm-up Start Flow>

Figure 5:
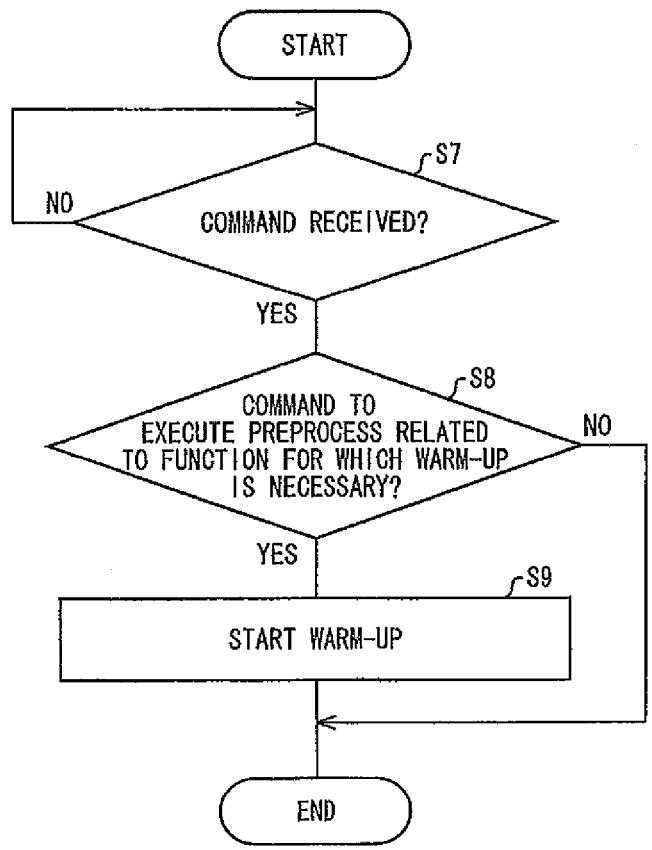
FIG. 5

The following description deals with the flow of a warm-up start process, which is a feature process in the present embodiment. FIG. 5 is a flow chart showing the flow of a warm-up start process. This process is carried out in parallel with the step of S2 in FIG. 3.

First, the control application section 23 determines whether or not a command transmitted from the first web server section 53 of the information processing apparatus 51 has been received from the web browser section 5 via the second web server section 8 (S7).

If such a command has been received from the information processing apparatus 51 (Yes in S7), the command analysis section 234 determines whether or not the command is a command to execute a preprocess related to a function for which a warm-up is necessary (S8). As mentioned above, if the type information and process content information contained in the command match particular registered information, the command analysis section 234 determines that the command is a command to execute a preprocess related to a function for which a warm-up is necessary.

Then, if the command analysis section 234 determines that the command is, a command to execute a preprocess (Yes in S8), the command analysis section 234 generates a command to start a warm-up of the image forming section 3 and sends the command to the apparatus control section 7, whereby the warm-up is started (S9).

Figure 6:
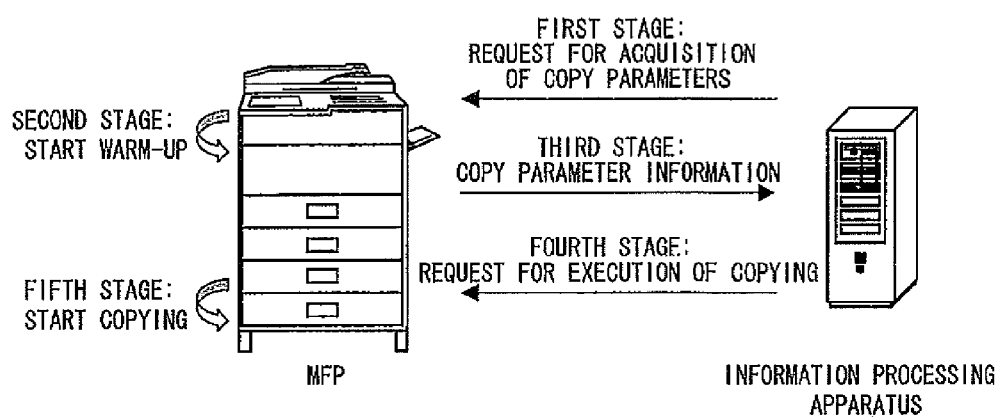
FIG. 6

For example, in a case where the preprocess is a process for transmitting parameters for the copying function, the process is carried out through such a procedure as shown in FIG. 6. That is, first, the external application section 54 of the information processing apparatus 51 transmits, to the multifunction apparatus 21, a parameter request command containing type information indicative of the COPY API section 231 and process content information indicative of a request for transmission of parameters relevant to the copying function and unique to the multifunction apparatus 21 (e.g., parameters indicative of the presence or absence of a two-sided copying function and the presence or absence of a finishing function (such as a stapling function or a punching function)) (first stage).

Then, the command analysis section 234 analyzes the command. It should be noted here that the command analysis section 234 has type information: "COPY"; "PRINT" and process content information: "request for transmission of parameter relevant to the copying or printing function" stored therein. Therefore, the command analysis section 234 determines that the command is a command to execute a preprocess related to a function for which a warm-up is necessary, whereby the warm-up is started (second stage).

After that, the multifunction apparatus 21 sends the parameters to the information processing apparatus 51 (third stage), and the information, processing apparatus 51 sends the multifunction apparatus 21 an instruction to start execution of the copying function (fourth stage). As a result, the multifunction apparatus 21 executes the copying function (fifth stage).

Figure 13:
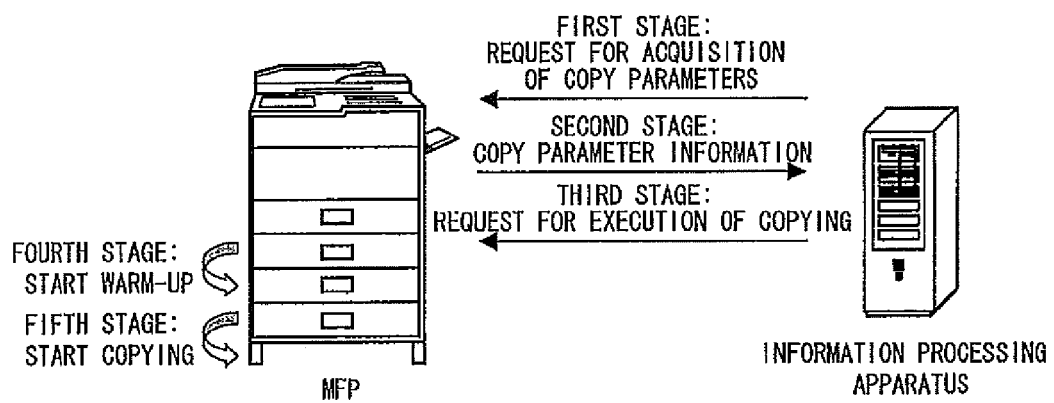
FIG. 13

It is understood from a comparison between FIGS. 6 and 13 that according to the present embodiment, the warm-up can be started at the second stage, which is earlier in timing than the warm-up in the conventional example shown in FIG. 13. This makes it possible to reduce a waiting time before the execution of the copy function at the fifth stage.

Thus, according to the present embodiment, upon receiving, from the information processing apparatus 51, a command to execute a preprocess which is a process related to a function for which a warm-up is necessary and which is carried out before the function is executed, the multifunction apparatus 21 starts a warm-up of the image forming section 3. This allows the multifunction apparatus 21 to start a warm-up before receiving an instruction to execute a function for which a warm-up is necessary and thereby reduce a user's waiting time period. Further, since the preprocess is a process related to a function for which a warm-up is necessary, a warm-up is started only when the execution of a function for which a warm-up is necessary is expected. Therefore, this prevents a warm-up from being started unnecessarily, thereby saving power.

<Specific Example>

Figure 7:
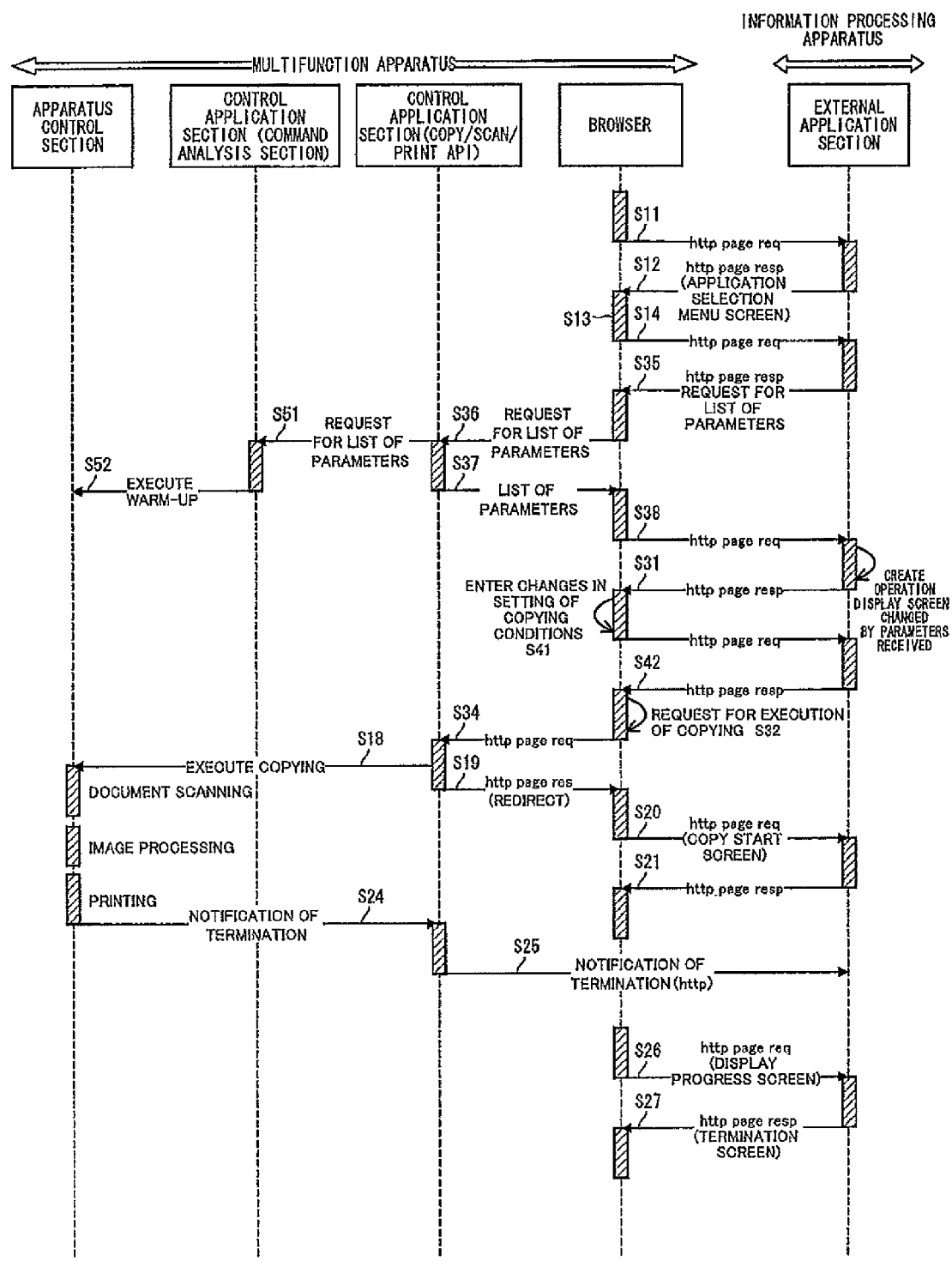
FIG. 7

The following description deals with a specific example process of the cooperative operation mode in the multifunction apparatus control system 100 according to the present embodiment. FIG. 7 is a view showing the sequence of a specific example process of the cooperative operation mode.

When an instruction to start up the cooperative operation mode has been entered via the input section 11, the apparatus control section 7 starts up the web browser section 5. Then, the web browser section 5 accesses the information processing apparatus 51 in accordance with a preset initial URL and transmits an HTTP Get command that requests, as an initial operation screen, an application selection menu screen for selecting an application (S11).

Upon receiving the HTTP Get command of S11, the external application section 54, in return, sends the multifunction apparatus 21 HTML data corresponding to an application selection menu screen corresponding to the Get command (S12). Then, as illustrated in FIG. 4, the web browser section 5 of the multifunction apparatus 21 causes the display section 10 to display a screen based on the HTML data (S13).

Let it be assumed here that the user has selected "EASY COPY APPLICATION". "EASY COPY APPLICATION" is an application for executing the copying function of the multifunction apparatus. Once the application has been selected, the web browser section 5 transmits, to the first web server section 53, an HTTP request indicative of the application thus selected (S14).

Then, in response to the HTTP request of S14, the external application section 54 transmits an HTTP response to the web browser section 5 via the first web server section 53 (S35).

The HTTP response, which is sent in return in S35, is a response (HTML-formatted control content (control information)) having a parameter request command described in Java (registered trademark) script, and the parameter request command, which is to be sent to the second web server section 8, starts up the control application section 23 to transmit unique information (which is here a list of parameter for the copying function of the multifunction apparatus 21) to the first web server section 53. The parameter request command contains type information indicative of the COPY API section 231, which is a target of operation, and process content information indicative of a request for the list of parameters. Further, the list of parameters for the copying function refers to parameters indicative of the presence or absence of a two-sided copying function, the presence or absence of a finishing function (such as a stapling function or a punching function), etc.

The Java (registered trademark) script command embedded in the HTML-formatted response is executable on a separate general-purpose web browser. Therefore, the web browser section 5, which operates on a general-purpose web browser, can easily execute the command. Specifically, the web browser section 5 carries out a process for notifying the second web server section 8 of the parameter request command. Then, the second web server section 8 starts up the control application section 23 (or the COPY API section 231 in particular) in accordance with the parameter request command (S36). After that, the control application section 23 reads out the list of parameters stored in advance. Then, the control application section 23 controls the web browser section 5 to send the first web server section 53 an HTTP request containing the list of parameters (S37, S38).

Figure 8:
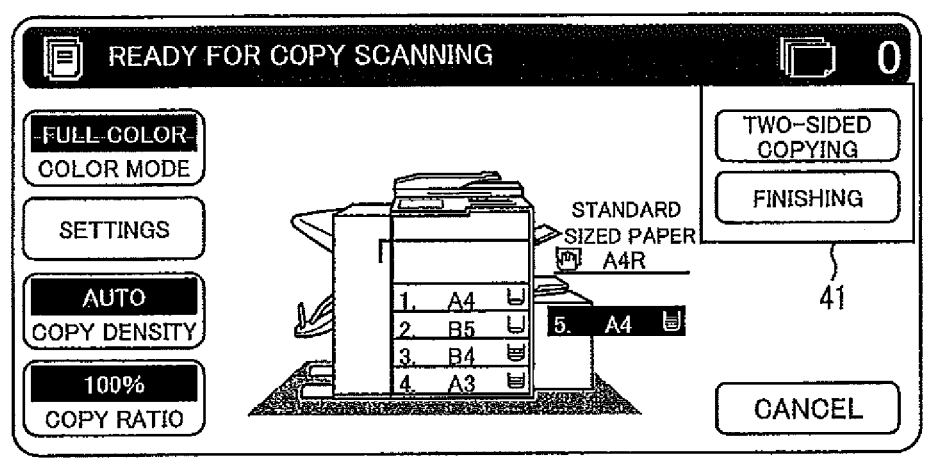
FIG. 8

This enables the external application section 54 to generate an operation screen that has been changed according to the parameters received by the first web server section 53, e.g., to generate such a copy operation screen as that shown in FIG. 8. That is, if, in S37 and 38, a list of parameters indicative of the presence of a two-sided copying function and a finishing function has been transmitted, the external application section 54 can generate a copy operation screen, such as that shown in FIG. 8, which contains an icon for setting the two-sided copying function and the finishing function. On the other hand, if a list of parameters indicative of the absence of a two-sided copying function and a finishing function has been transmitted, the external application section 54 needs only generate a copy operation screen that does not contain an icon for setting a two-sided copying function or a finishing function.

Then, the external application section 54 transmits, to the web browser section 5 via the first web server section 53, an HTTP response containing the operation screen thus generated (S31). As a result, the web browser section 5 can cause the display section 10 to display an operation screen corresponding to the model of multifunction apparatus 21.

Further, in the present embodiment, the command analysis section 234 is always checking commands to the API sections of the control application section 23. When the control application section 23 receives a command in S36, the command analysis section 234 analyzes the command to confirm whether or not the command is a command to execute a preprocess which is a process related to the copying function or the printing function and which is carried out before the function is executed. For example, if the type information contained in the command indicates either "COPY" or "PRINT" and the process content information indicates a request for transmission of parameters, the command analysis section 234 determines that the command is a command to execute a preprocess.

It should be noted here that the command received in S35 and S36 contains type information indicative of "COPY" and process content information indicative of a request for a list of parameters. Therefore, the command analysis section 234 determines that the command is a command to execute a preprocess, and issues a command for the apparatus control section 7 to execute a warm-up (S52). After that, the apparatus control section 7 starts a warm-up for switching the image forming section 3 from the waiting mode to the normal operation mode.

It should be noted that a process for making a copy actually through such an operation screen as that shown in FIG. 8 is carried out in the following manner. That is, when a user has entered changes in setting of copying conditions (copy ratios, sheets, etc.) through operation on the operation screen of FIG. 8 (S41), the external application section 54 generates an operation screen indicating that the changes in setting have been accepted and sends the operation screen to the multifunction apparatus 21 in return (S42). The operation screen contains a copy execution button. Further, HTML data indicative of the operation screen contains a Java (registered trademark) script command that calls up the COPY API section 231 when the copy execution button has been pressed and transmits, to a local loopback address, an instruction to execute the copying function under the copying conditions thus set.

Therefore, when the user presses the copy execution button on the operation screen (S32), the web browser section 5 accesses the second web server section 8 in accordance with the Java (registered trademark) script command. Then, the second web server section 8 calls the COPY API section 231 of the control application section 23 and passes the copying conditions to the COPY API section 231 (S34). After that, the COPY API section 231 generates a command which contains the copying conditions and which instructs the multifunction apparatus 21 to execute the copying function, and sends the command to the apparatus control section 7. Then, the apparatus control section 7 controls the image scanning section 2 and the image reading section 3 to execute the scanning, image processing, and printing functions (S18).

Further, in parallel with the step of S18, the control application section 23, in response to the web browser section 5, send an HTTP response to the web browser section 5 in return (S19). This HTTP response uses HTTP redirection to change the destination of access to the first web server section 53 of the information processing apparatus 51 and requests a copy start screen from the information processing apparatus 51. Then, the web browser section 5 analyzes the response and carries out a process in accordance with an URL designated by a location attribute. Since the information processing apparatus 51 has an IP address contained the URL designated by the Location attribute, the web browser section 5 sends the information processing apparatus 51 an HTTP request for operation screen data indicated by the URL (S20). After that, the first web sever section 53 of the image processing apparatus 51 responds to the multifunction apparatus 21 with HTML data indicative of an operation screen (copy start screen) corresponding to the HTTP request from the web browser section 5 (S21). Then, the web browser section 5 causes the display section 10 to display the copy start screen indicated by the HTML data.

It should be noted that the first web server section 53 responds to the web browser section 5 with an instruction to request a progress screen after a particular period of time. This causes the web browser section 5 after passage of a particular period of time to transmit, to the information processing apparatus 51, an HTTP request for a progress screen. Such an instruction to request a screen after a particular period of time is known as a publicly-known technique.

Further, upon completion of operation of the copying function, the apparatus control section 7 notifies the control application section 23 accordingly (S24). The control application section 23, notified of the termination of scanning, notifies the external application section 54 of the termination (S25).

Then, upon receiving, from the web browser section 5, the HTTP request for a progress screen (S26), the external application section 54, which has received the notification of termination from the control application section 23, generates HTML data of a screen indicative of the termination of scanning and transmits the HTML data to the web browser section 5 via the first web server section 53 (S27). This enables the web browser section 5 to cause the display section 10 to display a termination screen.

<Embodiment 2>

Another embodiment of the present invention is described below with reference to FIGS. 9 and 10. Note that members having functions identical with those described in the aforementioned embodiment have signs identical with those used in the aforementioned embodiment, and their explanations are omitted here for the sake of simple explanation, In Embodiment 1, in a case of causing the multifunction apparatus 21 to execute a process related any of its functions, the external application section 54 of the information processing apparatus 51 transmits, to the multifunction apparatus 21, such HTML data that the second web server section 8 of the multifunction apparatus 21 is notified of a command to execute the function. Thus, even if there is a firewall built between the multifunction apparatus 21 and the information processing apparatus 51, the information processing apparatus 51 can control the various functions of the multifunction apparatus 21 by use of the HTTP.

However, if there is no firewall built between a multifunction apparatus and an information processing apparatus, e.g., if the multifunction apparatus and the information processing apparatus communicate with each other via a LAN, the information processing apparatus can transmit, to the multifunction apparatus, control commands to execute processes related the functions of the multifunction apparatus, by use of a SOAP (Simple Object Access Protocol) or the like. This allows the information processing apparatus to control the functions of the multifunction apparatus without using a loopback address or the like as in Embodiment 1. The present embodiment is such an embodiment as this in which there is no firewall built between a multifunction apparatus and an information processing apparatus and the information processing apparatus transmits control commands to the multifunction apparatus by use of the SOAP.

Figure 9:
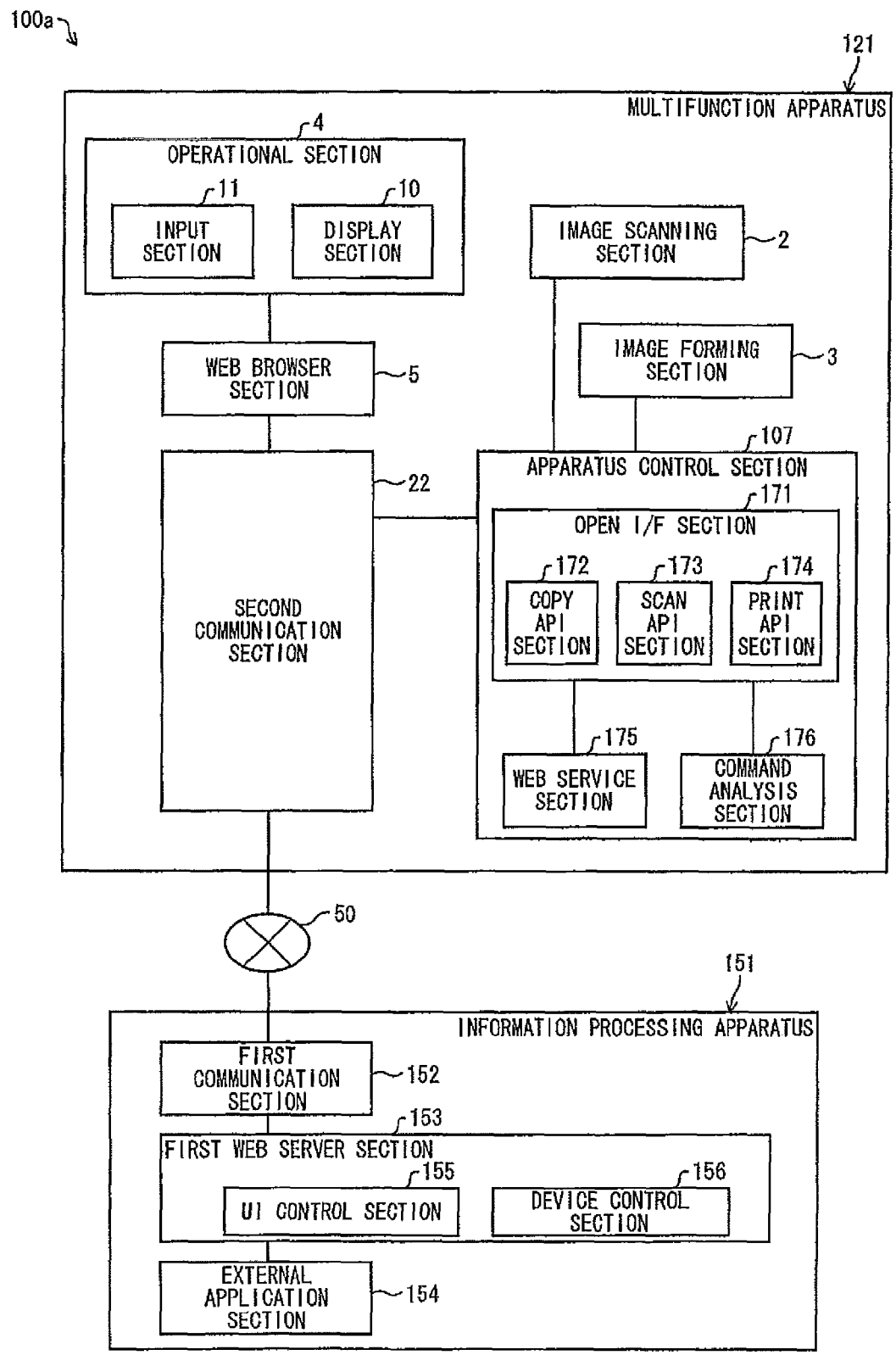
FIG. 9

FIG. 9 is a view illustrating an arrangement of a multifunction apparatus control system 100a in accordance with Embodiment 2. As illustrated in FIG. 9, the multifunction apparatus control system 100a includes a multifunction apparatus 121 and an information processing apparatus 151.

The multifunction apparatus 121 in accordance with the present embodiment is different from the multifunction apparatus 21 of FIG. 1 in that the multifunction apparatus 121 does not include a second web server section 8 or a control application section 23 and includes an apparatus control section 107 instead of an apparatus control section 7. It should be noted that in the present embodiment, the second communication section 22 can communicate by use of the SOAP as well as the HTTP.

The apparatus control section 107 includes an Open I/F section 171, a web service section 175, and a command analysis section 176, The Open I/F section 171, which discloses to the outside commands to control the various functions of the multifunction apparatus 121, receives a command from the outside and converts the command thus received into a command that can be recognized by the apparatus control section 107. The Open I/F section 171 includes a conversion table storage section not illustrated) having stored therein a conversion table in which a disclosed command and command that can be recognized by the apparatus control section 107 are associated with each other, and carries out a command conversion process in accordance with the conversion table.

Further, the Open I/F section 171 includes a COPY API section 172, a SCAN API section 173, and a PRINT API section 174. The COPY API section 172 receives an API instruction to execute a process related to the copying function of the multifunction apparatus 121. The SCAN API section 173 receives an API instruction to execute a process related to the scanning function of the multifunction apparatus 121. The PRINT API section 174 receives an API instruction to execute a process related to the printing function of the multifunction apparatus 121.

A command that is received by the Open I/F section 171 contains type information indicative of the type of API section by which the command is to be received and process content information indicative of the content of a process to be carried out.

The web service section 175 receives, by use of the SOAP, a command transmitted from the information processing apparatus 151 and sends the command thus received to the corresponding API section. In this way, the web service section 175 can function as a command acquisition section to directly acquire a command generated by the external application section 154, without use of a web browser section 5 as in Embodiment 1.

Further, in transmitting information to the information processing apparatus 151, the web service section 175 generates a SOAP command containing the information and sends the SOAP command to the information processing apparatus 151.

It should be noted that the web service section 175 has stored therein a command, an API section appropriate for control indicated by the command, with the command and the API section associated with each other, and calls up an appropriate API section in accordance with the content of storage.

The command analysis section 176 analyzes a command received by the web service section 175 from the information processing apparatus 151 and decides, in accordance with a result of the analysis, whether or not to start a warm-up of the image forming section 3, which is a mode switching target member of the multifunction apparatus 121. The method for analyzing a command and the method for determining whether or not a warm-up is started are identical to those employed by the command analysis section 234 of Embodiment 1, and as such, are not described here.

If the command analysis section 176 has decided that a warm-up of the image forming section 3 is started, the command analysis section 176 generates a command to start a warm-up. Then, the apparatus control section 107 starts a warm-up of the image forming section 3 in accordance with the command generated by the command analysis section 176.

Further, the information processing apparatus 151 in accordance with the present embodiment includes a first communication section 152, a first web server section 153, and an external application section 154.

The first communication section 152 communicates with the multifunction apparatus 121 via a LAN or the like. Further, the first communication section 152 communicates with the multifunction apparatus 121 by use of a communication protocol such as the HTTP or the SOAP.

The first communication section 152 receives information from the multifunction apparatus 121 and instructs the first web server section 153 and the external application section 154 to carry out a process corresponding to the information. It should be noted that examples of information that is received by the first communication section 152 from the multifunction apparatus 121 encompass transmission request information (request information) for data designated by a URL, pressed button information indicative of a button pressed on an operation screen indicated by operation screen data, and process request information for the external application section 154.

The first web server section 153 has the same function as the first web server section 53. Further, as illustrated in FIG. 9, the first web server section 153 includes a UI control section 155 and a device control section 156.

The UI control section 155 causes the multifunction apparatus 121 to output operation screen data corresponding to an instruction received by the first communication section 152. It should be noted that the UI control section 155 transmits operation screen data by use of the HTTP (or HTTPS).

The device control section 156 exchanges information with the multifunction apparatus 121 by use of the SOAP. Specifically, the device control section 156 transmits, to the multifunction apparatus 121, a control command received from the external application section 154 and acquires, from the multifunction apparatus 121, information generated by the multifunction apparatus 121 in response to the control command.

The external application section 154 has the same function as the external application section 54 of Embodiment 1. It should be noted that the external application section 154 outputs a response to the UI control section 155 in response to a request from the web browser section 5 of the multifunction apparatus 121, whereby the response is transmitted to the multifunction apparatus 121 by use of the HTTP (or HTTPS). Further, the external application section 154 outputs, to the device control section 156, a command to execute a process related to any of the various functions of the multifunction apparatus 121, whereby the command is transmitted to the multifunction apparatus 121 by use of the SOAP.

It should be noted that as with a command described in Embodiment 1, a command that is generated by the external application section 154 contains type information indicative of the type of API section, provided in the Open I/F section 171, by which the command is to be received and process content information indicative of the content of a process to be carried out.

According to the present embodiment, when the external application section 154 transmits a command to the multifunction apparatus 121 by use of the SOAP, the command analysis section 176 analyzes the command. That is, if the type information and process content information contained in the command match specific registered information, the command analysis section 176 determines that the command is a command to execute a preprocess. Then, if the command analysis section 176 determines that the command is a command to execute a preprocess, the command analysis section 176 generates a command to start a warm-up of the image forming section 3 and sends the command to the Open I/F section 171, whereby the warm-up is started.

Thus, according to the present embodiment, too, upon receiving, from the information processing apparatus 151, a command to execute a preprocess which is a process related to a function for which a warm-up is necessary and which is carried out before the function is executed, the multifunction apparatus 121 starts a warm-up of the image forming section 3. This allows the multifunction apparatus 121 to start a warm-up before receiving an instruction to execute a function for which a warm-up is necessary and thereby reduce a user's waiting time period.

<Specific Example>

The following description deals with a specific example process of the cooperative operation mode in the multifunction apparatus control system 100a according to the present embodiment. FIG. 10 is a view showing the sequence of a specific example process of the cooperative operation mode. It should be noted that steps identical to those of the process of FIG. 7 are given the same reference numerals, and as such, are not described.

Figure 10:
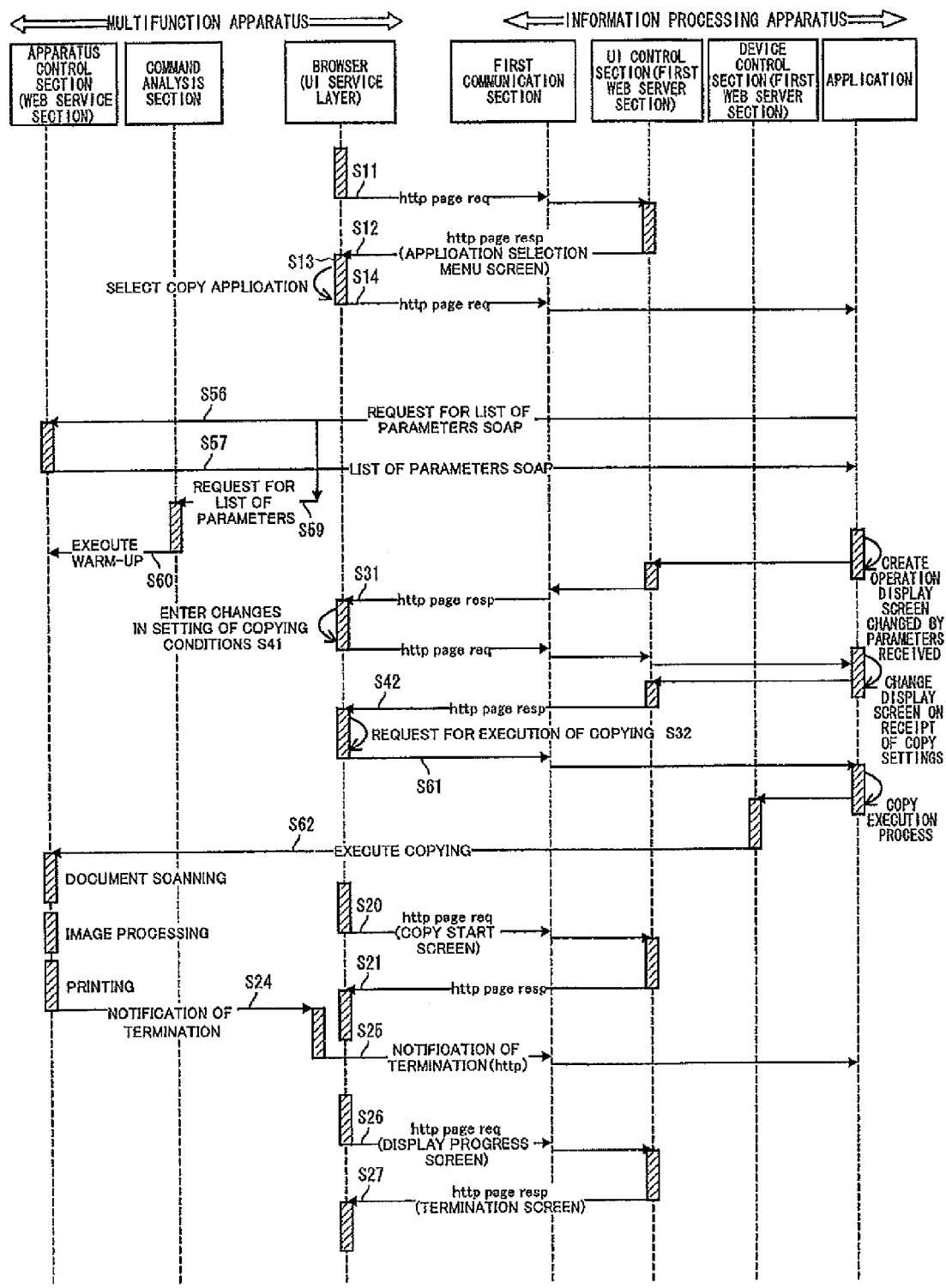
FIG. 10

When, as shown in FIG. 10, "EASY COPY APPLICATION" has been selected on the screen displayed in S13, the web browser section 5 transmits, to the information processing apparatus 151, an HTTP request indicative of the application thus selected (S14).

Then, in the information processing apparatus 151, the first communication section 152 receives the HTTP request, and the external application section 154 transmits, via the device control section 156 to the multifunction apparatus 121, a command that requests unique information (which is here a list of parameters for the copying function of the multifunction apparatus 121) of the multifunction apparatus 121 (S56). This command contains type information indicative of the COPY API section 172 and process content information indicative of a request for transmission of a list of parameters for the copying function.

In the apparatus control section 107 of the multifunction apparatus 121, the web service section 175 notifies the COPY API section 172 of the command. Then, the COPY API section 172 creates a list of parameters for the copying function of the multifunction apparatus 121 and sends the list of parameters to the information processing apparatus 151 in return via the web service section 175 (S57). It should be noted that the SOAP is used in the communication of S56 and S57.

After that, as in Embodiment 1, the external application section 154 generates an operation screen (see FIG. 8) corresponding to the parameters for the copying function of the multifunction apparatus 121 (e.g., parameters indicative of the presence of a two-sided copying function and a finishing function). Then, the external application section 154 transmits, via the UI control section 155 to the web browser section 5, an HTTP response containing the operation screen thus generated (S31). As a result, the web browser section 5 can cause the display section 10 to display an operation screen corresponding to the model of multifunction apparatus 121.

Further, in the present embodiment, the command analysis section 176 is always checking commands to the web service section 175. When the web service section 175 receives a command in S56, the command analysis section 176 analyzes the command to confirm whether or not the command is a command to execute a preprocess which is a process related to the copying function or the printing function and which is carried out before the function is executed. This confirmation method is as described above. In the specific example shown in FIG. 10, the command received in S56 contains type information indicative of "COPY" and process content information indicative of a request for a list of parameters. Therefore, the command analysis section 176 determines that the command is a command to execute a preprocess and issues a command for the apparatus control section 107 to execute a warm-up (S60). After that, the apparatus control section 107 starts a warm-up for switching the image forming section 3 from the waiting mode to the normal operation mode.

It should be noted that in the present embodiment, a process for making a copy actually through such an operation screen as that shown in FIG. 8 is carried out in the following manner. That is, when a user has entered changes in setting of copying conditions (copy ratios, sheets, etc.) through operation on the operation screen of FIG. 8 (S41), the external application section 154 generates an operation screen indicating that the changes in setting have been accepted and sends the operation screen to the multifunction apparatus 21 in return via the UI control section 155 and the first communication section 152 (S42). The operation screen contains a copy execution button.

When the user presses the copy execution button on the operation screen (S32), the web browser section 5 transmits, to the information processing apparatus 151, information indicating that the button has been pressed (S61). In the information processing apparatus 151, the external application section 154 generates a command to execute the copying function and transmits the command to the multifunction apparatus 121 via the device control section 156 and the first communication section 152 by use of the SOAP (S62).

After that, in the multifunction apparatus 121, which has received the command, the web service section 175 calls the COPY API section 172 in accordance with the command and passes information indicated by the command (information indicative of the copying conditions and the copy execution instruction) to the COPY API section 172. After that, the COPY API section 172 sends the image scanning section 2 and the image forming section 3 an instruction to execute a copy operation in accordance with the copying conditions, and the image scanning section 2 and the image forming section 3 execute the scanning, image processing, and printing functions.

Further, the web browser section 5 sends an HTTP request for a copy start screen (S20) and causes the display section 10 to display the copy start screen in accordance with an HTTP response received from the information processing apparatus 151 (S21).

Further, upon completion of operation of the copying function, the apparatus control section 107 controls the web browser section 5 to send the information processing apparatus 51 data indicative of a notification of termination (S24, S25). This allows the external application section 154 to recognize that the operation of the copying function has been terminated.

Furthermore, after the step of S21, the web browser section 5 sends the information processing apparatus 151 an HTTP request for a progress screen every time a particular period of time passes (S26). In the information processing apparatus 151, if the external application section 154 has received a notification of termination of operation of the copying function from the multifunction apparatus 121, the external application section 154 generates HTML data indicative of a termination screen, or if the external application section 154 has not received such a notification of termination, the external application section 154 generates HTML data indicating that the process is in execution, and sends the HTML data in return (S27). Thus, if a notification of termination has been received in S25, the multifunction apparatus 121 displays a termination screen.

[Modified Example]
<About a Warm-up>

In Embodiments 1 and 2 above, a warm-up is carried out in such a manner that the mode switching target member (which is the image forming section 3 here) switches from the waiting mode to the normal operation mode. However, part of the switching operation may be executed in S9 (FIG. 9), S52 (FIG. 7), or S60 (FIG. 10).

For example, in addition to the waiting mode and the normal operation mode, the image forming section 3 can have an energy saving mode in which a surface of a fixing device, which surface is being contact with a toner, has a higher temperature than that of the waiting mode but lower than that of the normal operation mode. In other words, the energy saving mode consumes electric power more than the waiting mode but less than the normal operation mode. It is possible to switch the image forming section 3 from the waiting mode to the energy saving mode in the step of S9 (S52 in FIG. 7 or S60 in FIG. 10). Moreover, when the multifunction apparatus 21 or 121 has received a command to execute the copying function (S18 or S62), the apparatus control section 7 or 107 may cause the image forming section 3 to switch from the waiting mode to the normal operation mode and then execute the scanning, image processing, and printing functions.

Figure 11:
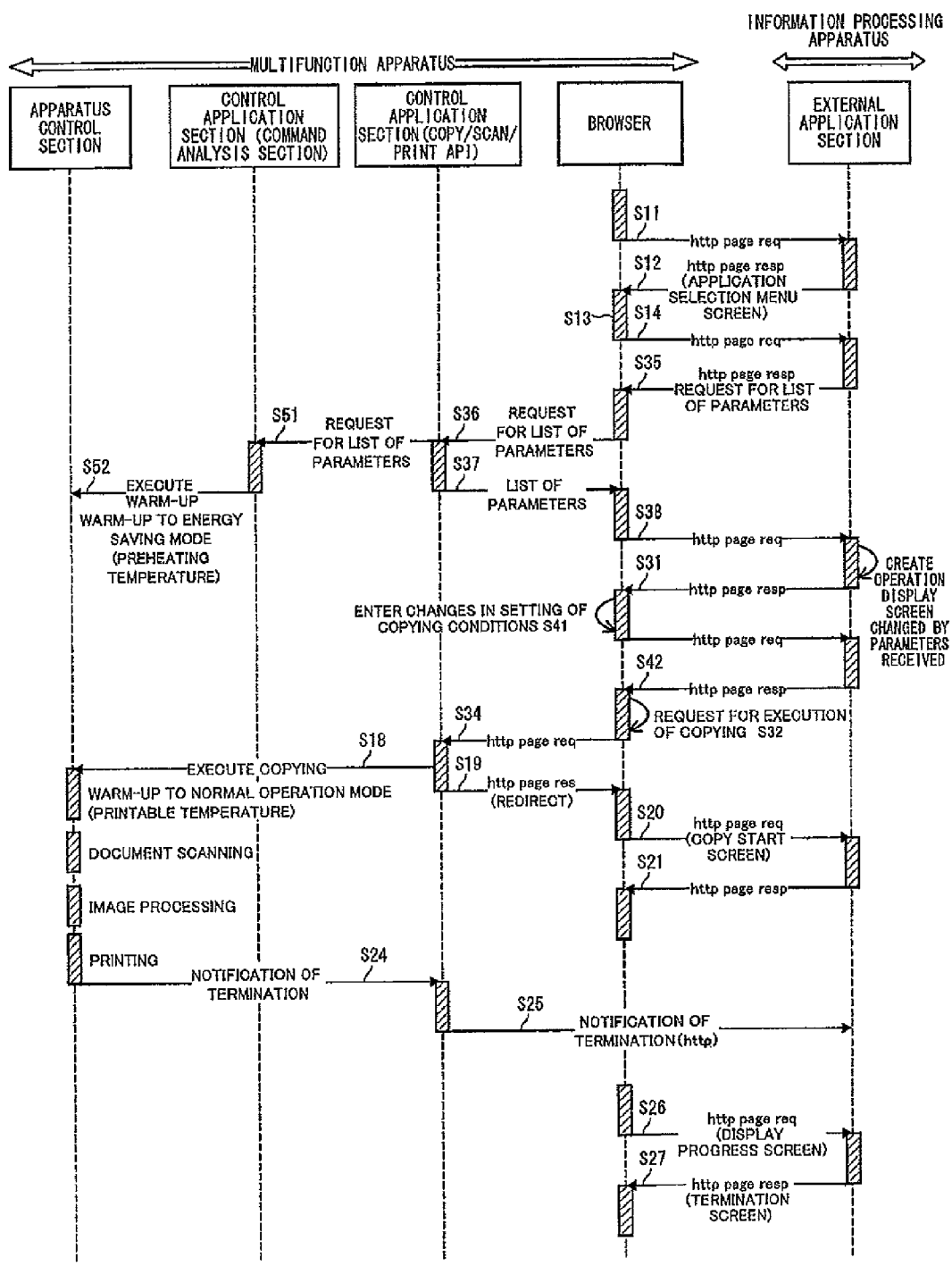
FIG. 11

FIG. 11 is a view showing a sequence of the present modified example. As shown in FIG. 11, the apparatus control section 7 switches the image forming section 3 from the waiting mode to the normal operation mode in S52. As the energy saving mode, a mode has been set in advance in which that surface of the fixing device which is in contact with the toner has a temperature 50% lower than in the normal operation mode (e.g., 90° C. when the temperature in the normal operation mode is 180° C.). Then, on receipt of a command in S18, the apparatus control section 7 causes the image forming section 3 to switch from the waiting mode to the normal operation mode and then execute the scanning, image processing, and printing functions. This makes it unnecessary to start up the image forming section 3 at once from the waiting mode to the normal operation mode, thus achieving a reduction in wasteful consumption of electric power.

<About Stoppage of a Warm-up>

There is a case where a user carries out an erroneous operation during communication between the web browser section 5 and the external application section 54. For example, a case is possible where the user has selected "EASY COPY APPLICATION" on the initial operation screen of FIG. 4 although he/she should have selected "DOCUMENT MANAGEMENT APPLICATION". In such a case, the user cancels "EASY COPY APPLICATION", returns to the screen of FIG. 4, and selects "DOCUMENT MANAGEMENT APPLICATION". However, as a result of the user having selected "EASY COPY APPLICATION" by mistake, a warm-up is started in accordance with S35, S36, and S51 of FIG. 7, although such a warm-up is not necessary.

Therefore, in the present modified example, even if such an unnecessary warm-up is started by mistake, the warm-up is stopped at an appropriate timing.

In the present modified example, when a command received by the control application section 23 is a command (non-specific command) to execute a process (which is here a process related to the scanning function) related to a function (non-specific function) for which a warm-up is not necessary, the command analysis section 234 generates a command to stop the warm-up and sends the command to the apparatus control section 7. Then, if, while the image forming section 3 is not in the waiting mode (including during the switch from the waiting mode to the normal operation mode (during a warm-up)), the apparatus control section 7 receives a command to stop the warm-up, the apparatus control section 7 returns the image forming section 3 to the waiting mode. Alternatively, if, during a warm-up of the image forming section 3, the apparatus control section 7 receives a command to stop the warm-up, the apparatus control section 7 returns the image forming section 3 to the waiting mode.

It should be noted that if the type information contained in the command is "SCAN", the command analysis section 234 may determine that the command is a command to execute a process related to a function for which a warm-up is not necessary.

Figure 12:
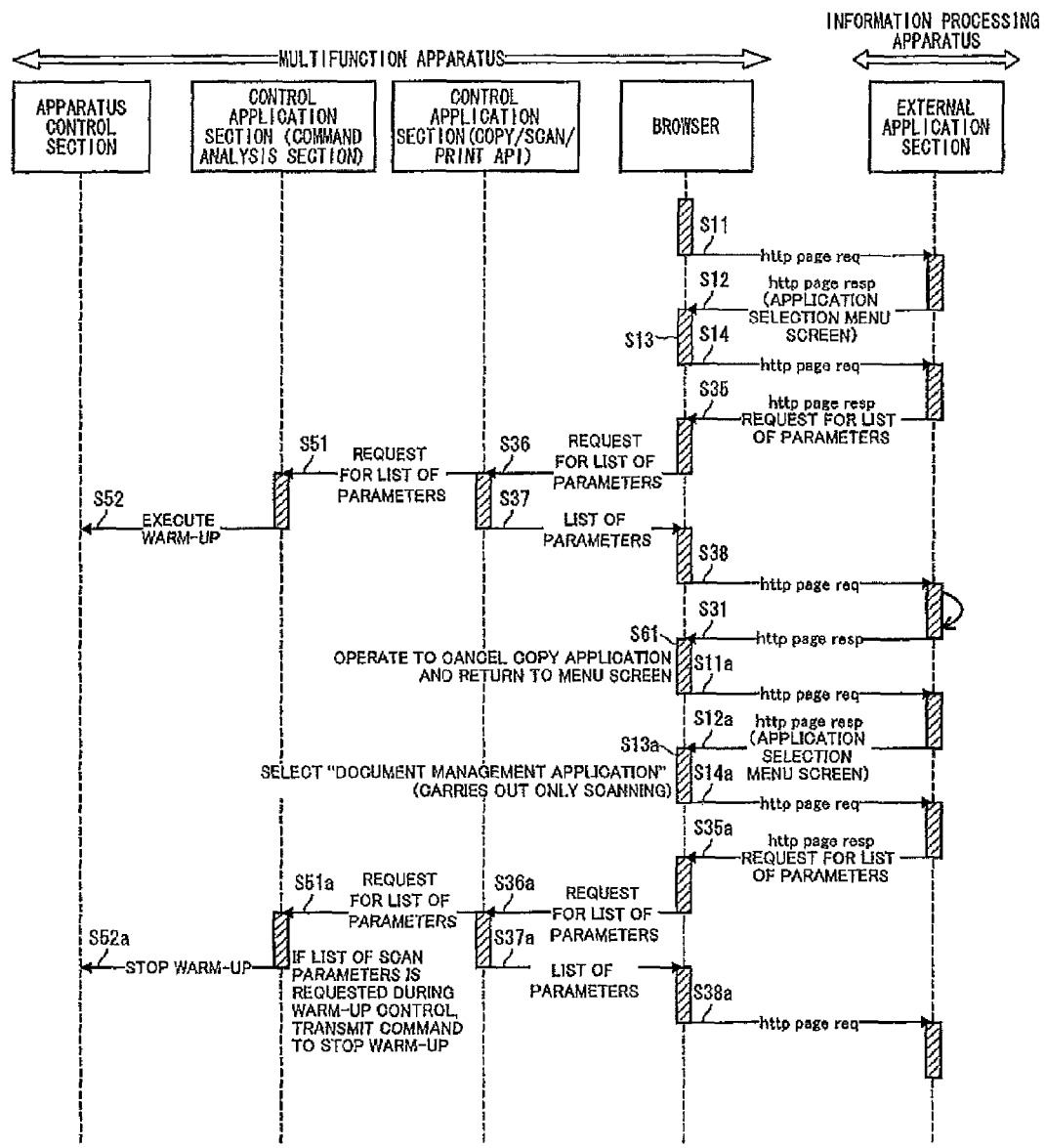
FIG. 12

FIG. 12 is a view showing a sequence of the present modified example. FIG. 12 shows a case where a user has selected "EASY COPY APPLICATION" by mistake although he/she should have selected "DOCUMENT MANAGEMENT APPLICATION".

If, in S13, the user selects "EASY COPY APPLICATION", a warm-up is started in accordance with S35, S36, S51, and S52 as explained in FIG. 7. Meanwhile, the user, having realized that he/she has made a wrong choice, presses a cancel button on the screen (FIG. 8) transmitted in S31 (S61). In the result, the web browser section 5 carries out the same step as S11 to transmit an HTTP Get command that requests an application selection menu screen (S11a), whereby the same process is carried out as S12 so that the application selection menu screen is displayed (S12a).

Then, the user selects his/her desired application "DOCUMENT MANAGEMENT APPLICATION" (S13a). The "DOCUMENT MANAGEMENT APPLICATION" here is an application that carries out a process for storing, in a memory device, image data scanned by the image scanning section 2 of the multifunction apparatus. As such, the "DOCUMENT MANAGEMENT APPLICATION" is an application that executes only the scanning function.

When the "DOCUMENT MANAGEMENT APPLICATION" has been selected, the web browser section 5 transmits, to the first web server section 53, an HTTP request indicative of the application selected (S14a).

Then, in response to the HTTP request of S14a, the external application section 54 transmits an HTTP response to the web browser section 5 via the first web server section 53 (S35a).

The HTTP response sent in return in S35a is a response (HTML-formatted control content (control information)), addressed to the second web server section 8, in which a parameter request command to start up the control application section 23 and transmit unique information (which is here a list of parameters for the scanning function of the multifunction apparatus 21) to the first web server section 53 is described in Java (registered trademark) script. This parameter request command contains type information indicative of the SCAN API section 232, which is a target of operation, and process content information indicative of a request for the list of parameters. Further, the list of parameters for the scanning function refers, for example, to parameters indicative of a type of file format of image data that can be created, the scanning capability (such as resolution) of the image scanning section 2, etc.

Then, the second web server section 8 starts up the control application section 23 (which is the SCAN API section 232 here) in accordance with the parameter request command (S36a). After that, the control application section 23 reads out the list of parameters stored in advance. Then, the control application section 23 controls the web browser section 5 to send an HTTP request containing the list of parameters to the first web server section 53 (S37a, S38a). After that, the external application section 54 generates an operation screen in accordance with the list of parameters and sends the operation screen to the multifunction apparatus 21 in return. Then, the operation of the scanning function is executed in accordance with information entered via the operation screen.

Further, in the present modified example, when the control application section 23 has received a command in S36a, the command analysis section 234 analyzes the command (S51a). Since the command here is a parameter request command containing type information indicative of the SCAN API section 232, which is a target of operation, the command analysis section 234 recognizes the command as an instruction to execute a process related to a function for which a warm-up is not necessary. Therefore, the command analysis section 234 sends the apparatus control section 7 a command to stop the warm-up (S52a). After that, the apparatus control section 7 returns the image forming section 3 to the waiting mode. This makes it possible to stop an unnecessary warm-up started by an application selected by a user by mistake, thus achieving a reduction in wasteful consumption of electric power.

<About Mode Switching Target Members>

In the embodiments above, the image forming section 3 has been described as an example of a mode switching target member. However, the mode switching target member is not limited to the image forming section 3. For example, the image scanning section 2 may be a mode switching target member having a normal operation mode and a waiting mode. The image scanning section 2 includes an exposure unit for scanning an image of a document. Light emitted from the exposure unit changes in accordance with an amount of a current. It is preferable that light is stably emitted in a constant amount. While there is demand for a higher energy saving effect, a certain sort of a light source of the exposure unit takes a long time to start stably emitting its light in a constant amount since it started to receive electric power. In view of this, the image scanning section 12 can be provided switchable between a normal operation mode in which light can be emitted in a constant amount, and a waiting mode in which power consumption is lower than that of the normal operation mode. With the arrangement, the image scanning section 2 is in the waiting mode while the image scanning section 2 is not in operation. Immediately before the image scanning section is started to operate, the warm-up for switching the image scanning section 2 from the waiting mode to the normal operation mode is carried out so that the image scanning section 2 becomes in the normal operation mode.

It should be noted that in a case where the image scanning section 2 and the image forming section 3 exist as mode switching target members, the command analysis section 234 or 176 needs only carry out such a process as follows: In the case of a command containing type information indicative of "SCAN" and process content information indicative of a preprocess that is carried out before the scanning function is executed, the command analysis section 234 or 176 determines that a warm-up for switching the image scanning section 2 from the waiting mode to the normal operation mode is started; alternatively, in the case of a command containing type information indicative of "COPY" and process content information indicative of a preprocess that is carried out before the copying function is executed, the command analysis section 234 or 176 determines that a warm-up for switching the image scanning section 2 and the image forming section 3 from the waiting mode to the normal operation mode is started; and, alternatively, in the case of a command containing type information indicative of "PRINT" and process content information indicative of a preprocess that is carried out before the printing function is executed, the command analysis section 234 or 176 determines that a warm-up for switching the image forming section 3 from the waiting mode to the normal operation mode is started.

Further, in the embodiments above, information indicative of a request for transmission of parameters has been described as an example of process content information. However, process content information is not limited to such information, but needs only be information indicative of a process that is carried out before execution of a function for which a warm-up is necessary. Alternatively, the process content information may be indicative of a process other than a process for executing a function for which a warm-up is necessary.

As described above, a multifunction apparatus of the present invention is a multifunction apparatus which carries out a cooperation process in cooperation with an application executed on an external information processing apparatus, including: a mode switching target member having (i) a normal operation mode and (ii) a waiting mode which is lower in power consumption than the normal operation mode, the mode switching target member being switchable between the normal operation mode and the waiting mode; a command acquisition section for acquiring a command generated based on the application; and a command analysis section for determining whether or not the command acquired by the command acquisition section is a specific command to execute a preprocess which is a process related to a specific function that causes the mode switching target member to operate and which is carried out before the specific function is executed, and for, if the command analysis section determines that the command acquired by the command acquisition section is the specific command, starting a switching operation for switching the mode switching target member from the waiting mode to the normal operation mode or starting a part of the switching operation.

According to the arrangement, at the timing of acquisition of a command to execute a preprocess which is a process related to a specific function that causes the mode switching target member to operate and which is carried out before the specific function is executed, a switching operation (warm-up) for switching the mode switching target member from the waiting mode to the normal operation mode or a part of the switching operation is started.

Thus, even in a case where the multifunction apparatus carries out the cooperation process in cooperation with the application executed on the external information processing apparatus, the warm-up is started at a timing earlier than the timing at which the specific function is executed. This makes it possible to reduce a user's waiting time period.

Further, the application executed on the information processing apparatus does not require control of a warm-up. This makes it possible to develop an application without considering control of a warm-up.

Furthermore, the multifunction apparatus of the present invention is preferably arranged such that: the information processing apparatus includes a first web server section that operates in accordance with software of a web server, the multifunction apparatus further including: a web browser section that operates in accordance with software of a web browser; a second web server section that operates in accordance with software of a web browser, the web browser section carrying out a notification process for notifying the second web server section of a command received from the first web server section, the multifunction apparatus further including an apparatus control section for controlling the multifunction apparatus in accordance with the command of which the second web server section has been notified, the command analysis section acquiring, as the command generated based on the application, the command of which the second web server section has been notified by the notification process.

According to the arrangement, the apparatus control section needs only receive a command from the second web server section installed inside of the multifunction apparatus, and does not need to receive a command from the first web server section of the information processing apparatus. Since the apparatus control section and the second web server section are provided in the same multifunction apparatus, no firewall is built between the apparatus control section and the second web server section. In the result, the information processing apparatus can control the multifunction apparatus even if there is a firewall built in a communication network between the multifunction apparatus and the information processing apparatus.

Furthermore, the multifunction apparatus of the present invention may be arranged such that: the information processing apparatus includes a first web server section that operates in accordance with software of a web server, the multifunction apparatus further including an apparatus control section for receiving a command transmitted to the multifunction apparatus by the first web server section via a communication network and controlling the multifunction apparatus in accordance with the command, the command acquisition section acquiring, as the command generated based on the application, the command received by the apparatus control section from the first web server section.

In this case, the first web server section can transmit a command directly to the apparatus control section. This allows the information processing apparatus to easily control the multifunction apparatus, for example, by use of the SOAP or the like.

Furthermore, the multifunction apparatus of the present invention may be arranged such that: the mode switching target member is an image forming section for forming an image on a recording sheet; and the specific command indicates an instruction to transmit, to the information processing apparatus, parameters relevant to a printing function or a copying function in the multifunction apparatus and unique to the multifunction apparatus.

According to the arrangement, at the timing of acquisition of a command to transmit, to the information processing apparatus, parameters relevant to a printing function or a copying function in the multifunction apparatus and unique to the multifunction apparatus, a switching operation (warm-up) for switching the image forming section from the waiting mode to the normal operation mode is started. Reception of a command to transmit parameters for the printing function or the copying function is highly likely to be followed by execution of the printing function or the copying function. Therefore, a warm-up of the image forming section can be started at a timing earlier than the timing at which the printing function or the copying function is executed. This makes it possible to reduce a user's waiting time period.

Furthermore, the multifunction apparatus of the present invention may be arranged such that: the mode switching target member has an energy saving mode which is higher than the waiting mode but lower than the normal operation mode in power consumption; and if the command analysis section determines that the command acquired by the command acquisition section is the specific command, the command analysis section switches the mode switching target member from the waiting mode to the energy saving mode.

According to the arrangement, the mode switching target member does not switch from the waiting mode to the normal operation mode at once. This makes it possible to prevent electric power from being wastefully consumed by starting up the mode switching target member at once from the waiting mode to the normal operation mode.

Furthermore, the multifunction apparatus of the present invention may be arranged such that if the command analysis section determines that the command acquired by the command acquisition section is a non-specific command to execute a process related to a non-specific function that does not cause the mode switching target member to operate, the command analysis section returns the mode switching target member to the waiting mode.

It is possible that a user's erroneous operation causes the application to generate a specific command so that a warm-up is started unnecessarily. However, according to the arrangement, if the command acquired by the command acquisition section is a non-specific command, the command analysis section returns the mode switching target member to the waiting mode. Therefore, when the user carries out a proper operation after an erroneous operation and the application generates a non-specific command, the mode switching target member is returned to the waiting mode. That is, the warm-up is stopped. This makes it possible to prevent electric power from being wastefully consumed by a user's erroneous operation.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each of the blocks of the multifunction apparatuses 21 and of the information processing apparatus 51 can be realized by a hardware logic or by software by use of a CPU as described below.

That is, the multifunction apparatuses 21 and 121 and the information processing apparatuses 51 and 151 each include: the CPU (central processing unit) which executes an instruction of a control program realizing each of the functions described above; a ROM (read only memory) in which the program is stored; an RAM (random access memory) which develops the program; a storage device (storage medium), such as a memory, in which the program and various kinds of data are stored; and the like. Further, the object of the present invention can be achieved in the following manner: (i) a storage medium for computer-readably storing a program code (an execute form program, intermediate code program, or source program), which is software for implementing the aforementioned functions, is provided to each of the multifunction apparatuses 21 and 121 and the information processing apparatuses 51 and 151, and (ii) a computer (or a CPU or an MPU (Microprocessor Unit)) of each of the multifunction apparatuses 1 and 1a reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs, MOs, MDs, DVDs, and CD-Rs; cards, such as IC cards (including memory cards) and optical cards; and semiconductor memories, such as mask ROMs, EPROMs, EEPROMs, and flash ROMs.

Further, the multifunction apparatuses 21 and 121 and the information processing apparatuses 51 and 151 can each be made connectable to a communication network, and the program code can be supplied via the communication network. The communication networks are not limited to specific means. Examples of the communication network encompass the Internet, an intranet, an extranet, a LAN, an ISDN, a VAN, a CATV communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE 1394 standard, a USB line, a power line, a cable TV line, a telephone line, an ADSL line, and the like, as the transmission medium. Moreover, it is possible to use (i) a wireless line utilizing an infrared ray used in IrDA and a remote controller, (ii) a wireless line which is in compliance with a Bluetooth standard (registered trademark) or an IEEE802.11 wireless standard, and (iii) a wireless line utilizing an HDR, a mobile phone network, a satellite line, a terrestrial digital network, and the like, as the transmission medium. Note that, the present invention can be realized by a computer data signal which is realized by electronic transmission of the program code and which is embedded in a carrier wave.

Industrial Applicability

The present invention is suitably applicable to a multifunction apparatus that realizes a plurality of functions such as a copying function, a scanning function, and a facsimile sending/receiving function.

Reference Signs List

2: Image scanning section (mode switching target member)
3: Image forming section (mode switching target member)
5: Web browser section
7, 107: Apparatus control section
8: Second web server section (command acquisition section)
21, 121: Multifunction apparatus
22: Second communication section
23: Control application section
51, 151: Information processing apparatus
52, 152: First communication section
53, 153: First web server section
54, 154: External application section
175: Web service section (command acquisition section)
176, 234: Command analysis section

The invention claimed is:

1. A multifunction apparatus which carries out a cooperation process in cooperation with an application executed on an external information processing apparatus, comprising:
a mode switching target member having (i) a normal operation mode and (ii) a waiting mode which is lower in power consumption than the normal operation mode, the mode switching target member being switchable between the normal operation mode and the waiting mode;
a command acquisition section for acquiring a command generated based on the application; and
a command analysis section for determining whether or not the command acquired by the command acquisition section is a specific command to execute a preprocess which is a process related to a specific function that causes the mode switching target member to operate and which is carried out before the specific function is executed, and for, if the command analysis section determines that the command acquired by the command acquisition section is the specific command, starting a switching operation for switching the mode switching target member from the waiting mode to the normal operation mode or starting a part of the switching operation.

2. The multifunction apparatus as set forth in claim 1, wherein:
the information processing apparatus includes a first web server section that operates in accordance with software of a web server,
the multifunction apparatus further comprising:
a web browser section that operates in accordance with software of a web browser;
a second web server section that operates in accordance with software of a web browser,
the web browser section carrying out a notification process for notifying the second web server section of a command received from the first web server section,
the multifunction apparatus further comprising an apparatus control section for controlling the multifunction apparatus in accordance with the command of which the second web server section has been notified, the command analysis section acquiring, as the command generated based on the application, the command of which the second web server section has been notified by the notification process.

3. The multifunction apparatus as set forth in claim 1, wherein:
the information processing apparatus includes a first web server section that operates in accordance with software of a web server,
the multifunction apparatus further comprising an apparatus control section for receiving a command transmitted to the multifunction apparatus by the first web server section via a communication network and controlling the multifunction apparatus in accordance with the command,
the command acquisition section acquiring, as the command generated based on the application, the command received by the apparatus control section from the first web server section.

4. The multifunction apparatus as set forth in claim 1, wherein:
the mode switching target member is an image forming section for forming an image on a recording sheet; and
the specific command indicates an instruction to transmit, to the information processing apparatus, parameters relevant to a printing function or a copying function in the multifunction apparatus and unique to the multifunction apparatus.

5. The multifunction apparatus as set forth in claim 1, wherein:
the mode switching target member has an energy saving mode which is higher than the waiting mode but lower than the normal operation mode in power consumption; and
if the command analysis section determines that the command acquired by the command acquisition section is the specific command, the command analysis section switches the mode switching target member from the waiting mode to the energy saving mode.

6. The multifunction apparatus as set forth in claim 1, wherein if the command analysis section determines that the command acquired by the command acquisition section is a non-specific command to execute a process related to a non-specific function that does not cause the mode switching target member to operate, the command analysis section returns the mode switching target member to the waiting mode.

* * * * *